(12) United States Patent
Jhaveri et al.

(10) Patent No.: US 7,930,346 B2
(45) Date of Patent: Apr. 19, 2011

(54) SECURITY IN PEER TO PEER SYNCHRONIZATION APPLICATIONS

(75) Inventors: Vivek Jawahir Jhaveri, Seattle, WA (US); Lev Novik, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 997 days.

(21) Appl. No.: 11/211,119

(22) Filed: Aug. 24, 2005

(65) Prior Publication Data

US 2007/0067349 A1    Mar. 22, 2007

(51) Int. Cl.
*G06F 15/16*    (2006.01)
(52) U.S. Cl. ........ 709/204; 709/201; 709/217; 709/227; 709/236; 709/231
(58) Field of Classification Search .................. 709/201, 709/217, 227, 236, 231, 204
See application file for complete search history.

(56) References Cited

U.S. PATENT DOCUMENTS

| | | | |
|---|---|---|---|
| 6,892,210 B1 | 5/2005 | Erickson et al. | |
| 2003/0120699 A1 | 6/2003 | Hostetter et al. | |
| 2005/0037787 A1* | 2/2005 | Bachner et al. | 455/502 |
| 2005/0144195 A1* | 6/2005 | Hesselink et al. | 707/201 |
| 2006/0136441 A1* | 6/2006 | Fujisaki | 707/101 |
| 2006/0218394 A1* | 9/2006 | Yang | 713/167 |
| 2007/0005707 A1* | 1/2007 | Teodosiu et al. | 709/206 |
| 2007/0081530 A1* | 4/2007 | Nomura et al. | 370/389 |
| 2008/0320563 A1* | 12/2008 | Cornpropst et al. | 726/3 |
| 2009/0138808 A1* | 5/2009 | Moromisato et al. | 715/758 |

FOREIGN PATENT DOCUMENTS

| | | |
|---|---|---|
| WO | WO 2005/024665 | 3/2005 |
| WO | WO2005-024665 | 3/2005 |

OTHER PUBLICATIONS

International Search Report dated Apr. 8, 2007, mailed Sep. 28, 2007 for PCT Application No. 2006/28390, 2 pages.
Foley S. N. Ed, Association for Computing Machinery: "Conduit Cascades and Secure Synchronization" Proceedings of the New Security Paradigms Workshop, Sep. 18-22, 2000, pp. 141-150.
Kogan B., Jajodia, S.: "Concurrency Control in Multilevel-Secure Databases based on Replicated Architecture", New York, USA, 1990.

\* cited by examiner

*Primary Examiner* — Dohm Chankong
*Assistant Examiner* — Lan-Dai T Truong
(74) *Attorney, Agent, or Firm* — Workman Nydegger

(57) ABSTRACT

The claimed subject matter provides a system and/or a method that facilitates synchronizing data within a data storage system. An interface component can leverage a synchronization technique within the data storage system. A sync component can provide a secure peer to peer data synchronization based at least in part upon the synchronization technique to allow a tiered access to the synchronized data.

20 Claims, 20 Drawing Sheets

SECURITY IN PEER TO PEER SYNCHRONIZATION APPLICATIONS

BACKGROUND

Advances in computer technology (e.g., microprocessor speed, memory capacity, data transfer bandwidth, software functionality, and the like) have generally contributed to increased computer application in various industries. Ever more powerful server systems, which are often configured as an array of servers, are commonly provided to service requests originating from external sources such as the World Wide Web, for example.

As the amount of available electronic data grows, it becomes more important to store such data in a manageable manner that facilitates user friendly and quick data searches and retrieval. Today, a common approach is to store electronic data in one or more databases. In general, a typical database can be referred to as an organized collection of information with data structured such that a computer program can quickly search and select desired pieces of data, for example. Commonly, data within a database is organized via one or more tables. Such tables are arranged as an array of rows and columns.

Also, the tables can comprise a set of records, wherein a record includes a set of fields. Records are commonly indexed as rows within a table and the record fields are typically indexed as columns, such that a row/column pair of indices can reference particular datum within a table. For example, a row can store a complete data record relating to a sales transaction, a person, or a project. Likewise, columns of the table can define discrete portions of the rows that have the same general data format, wherein the columns can define fields of the records.

Each individual piece of data, standing alone, is generally not very informative. Database applications make data more useful because they help users organize and process the data. Database applications allow the user to compare, sort, order, merge, separate and interconnect the data, so that useful information can be generated from the data. Capacity and versatility of databases have grown incredibly to allow virtually endless storage capacity utilizing databases. However, typical database systems offer limited query-ability based upon time, file extension, location, and size. For example, in order to search the vast amounts of data associated to a database, a typical search is limited to a file name, a file size, a date of creation, etc., wherein such techniques are deficient and inept.

With a continuing and increasing creation of data from end-users, the problems and difficulties surrounding finding, relating, manipulating, and storing such data is escalating. End-users write documents, store photos, rip music from compact discs, receive email, retain copies of sent email, etc. For example, in the simple process of creating a music compact disc, the end-user can create megabytes of data. Ripping the music from the compact disc, converting the file to a suitable format, creating a jewel case cover, and designing a compact disc label, all require the creation of data.

Not only are the complications surrounding users, but developers have similar issues with data. Developers create and write a myriad of applications varying from personal applications to highly developed enterprise applications. While creating and/or developing, developers frequently, if not always, gather data. When obtaining such data, the data needs to be stored. In other words, the problems and difficulties surrounding finding, relating, manipulating, and storing data affect both the developer and the end user.

Moreover, with the endless amount of data surrounding developers and/or users, data consistency between disparate machines and/or systems can be a complicated and overwhelming task. For example, a user can utilize a laptop machine and a desktop, wherein data consistency and/or synchronization are of vital concern. In particular, with each machine and/or system generating large amounts of data, the synchronization of such data is an extremely difficult objective.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate synchronizing data associated with at least two disparate data storage systems. A data storage system can be a complex model based at least upon a database structure, wherein an item, a sub-item, a property, and a relationship are defined to allow representation of information within a data storage system as instances of complex types. A sync component creates a secure peer to peer data synchronization to allow multiple users to access such synchronized data at various tiers and/or levels. The sync component synchronizes data associated with the data storage system and a disparate data storage system, wherein a secure peer to peer synchronization community can be established. The sync component secures metadata, including a membership list (e.g., list of user access rights and/or privileges) of the synchronization community such that a user with appropriate access is able to modify it (e.g., to add and/or remove a user from the community) and transmit a change and/or manipulation to other users. The data can also be secured such that a user with appropriate access is able to modify it and transmit the changes to the other users.

In other words, the sync component can implement the management of complex synchronization relationships. For instance, the synchronization relationships can include, but is not limited to, setup, tear-down, and security management. Moreover, the sync component can implement the management of complex synchronization relationships based entirely on a synchronization technology. It is to be appreciated and understood that any suitable synchronization technology can be implemented such as, for instance, the synchronization technology related to a data storage system.

In accordance with one aspect of the claimed subject matter, the sync component can leverage the existing synchronization techniques and/or mechanisms associated with the data storage system. The sync component can utilize the data storage system that includes a track component to track data changes to various entities stored inside the data storage system, and in particular, a store within the data storage system. The track component can capture the data change(s) to the entities to facilitate synchronizing data between two disparate systems maintaining sets of data. By leveraging the existing synchronizing techniques and/or mechanisms within the data storage system, the sync component can provide a secure peer to peer synchronized community without any new mechanisms and/or techniques.

In accordance with another aspect of the claimed subject matter, the sync component can include a user sync manager that can facilitate creating synchronized relationships, creating synchronized containers, inviting users, accepting invitations, joining a community, removing users, maintaining membership lists, and/or overall management of the peer to peer synchronized community. Moreover, the sync component can include at least one of a manual sync and/or an auto sync. The manual sync can allow a user to a user to manually synchronize data. Moreover, the auto sync can provide an automatic synchronization of data elected to the peer to peer data synchronization.

In accordance with another aspect of the claimed subject matter, the sync component can include a peer to peer sync application that runs as a local system to expose at least one operation to an application. The operation can be at least one of the following: create a share at a specified container; create permissions to a container; add a permission to a container; validate an owner of a container; set a group membership based on a list; and delete a share created on a container. Furthermore, the sync component can include an integrate component that facilitates integration between the sync component (e.g., and in particular the peer to peer sync application) into an operation system with other applications. Moreover, the sync component can include an API component that can perform synchronized folder creation and/or management programmatically. In other aspects of the claimed subject matter, methods are provided that facilitate synchronizing data associated with at least two disparate data storage systems.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

Figure 1:
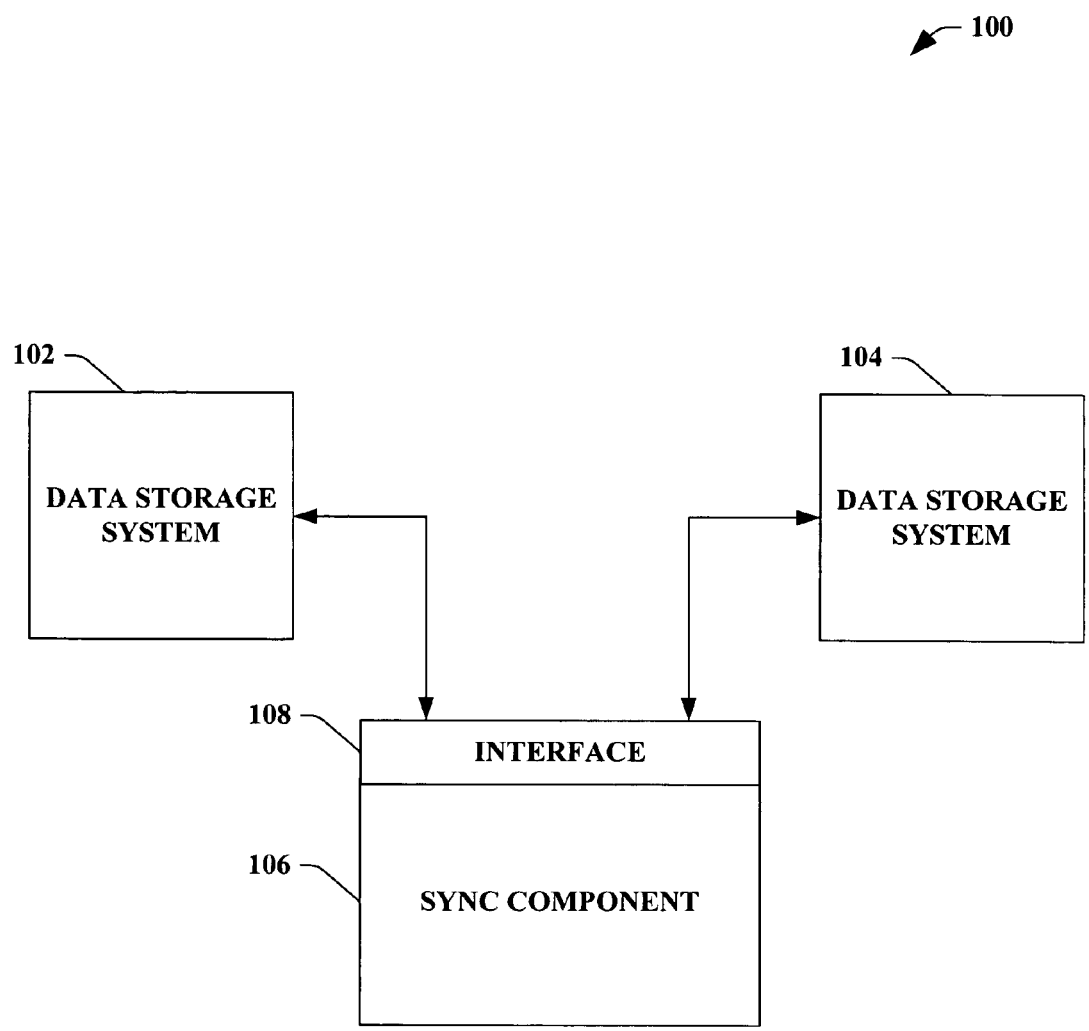
FIG. 1 illustrates a block diagram of an exemplary system that facilitates synchronizing data associated with at least two disparate data storage systems.

Appendix A is an example of pseudo code associated with the claimed subject matter.

DETAILED DESCRIPTION

As utilized herein, terms "component," "system," "interface," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

Now turning to the figures, FIG. 1 illustrates a system 100 that facilitates synchronizing data associated with at least two disparate data storage systems. A data storage system 102 can be a complex model based at least upon a database structure, wherein an item, a sub-item, a property, and a relationship are defined to allow representation of information within a data storage system as instances of complex types. The data storage system 102 can utilize a set of basic building blocks for creating and managing rich, persisted objects and links between objects. An item can be defined as the smallest unit of consistency within the data storage system 102, which can be independently secured, serialized, synchronized, copied, backup/restored, etc. The item is an instance of a type, wherein all items in the data storage system 102 can be stored in a single global extent of items. The data storage system 102 can be based upon at least one item and/or a container structure. Moreover, the data storage system can be a storage platform exposing rich metadata that is buried in files as items. It is to be appreciated that the data storage system 102 can represent a database-based file storage system to support the above discussed functionality, wherein any suitable characteristics and/or attributes can be implemented. Furthermore, the data storage system 102 can utilize a container hierarchical structure, wherein a container is an item that can contain at least one other item. The containment concept is implemented via a container ID property inside the associated class. A store can also be a container such that the store can be a physical organizational and manageability unit. In addition, the store represents a root container for a tree of containers within the hierarchical structure.

A sync component 106 can create a secure peer to peer data synchronization to allow multiple users to access such synchronized data at various tiers and/or levels. The sync component 106 can allow the synchronization of data associated with the data storage system 102 and a disparate data storage system 104, wherein a secure peer to peer synchronization community can be established. The sync component 106 can secure metadata, including a membership list (e.g., list of user access rights and/or privileges) of the synchronization community such that a user with appropriate access is able to modify it (e.g., to add and/or remove a user from the community) and transmit a change and/or manipulation to other users. The data can also be secured such that a user with appropriate access is able to modify it and transmit the changes to the other users. The security mechanism can invoke an underlying authentication and/or authorization mechanism such as, but not limited to, share level security, item level security, operating system authentication and authorization, etc. Moreover, the sync component 106 can provide membership list synchronization in a substantially similar manner to that which data can be synchronized.

In other words, the sync component 106 can implement the management of complex synchronization relationships. For instance, the synchronization relationships can include, but is not limited to, setup, tear-down, and security management. Moreover, the sync component 106 can implement the management of complex synchronization relationships based entirely on a synchronization technology. It is to be appreciated and understood that any suitable synchronization technology can be implemented such as, for instance, the synchronization technology related to a data storage system 102 and/or a disparate data storage system 104.

The sync component 106 can utilize a replica (e.g., synchronized data and/or folders belonging to at least one user in the community) to announce at least one of the following: 1) presence within the community; and 2) intention to depart the community by synchronizing a request to a manager (e.g., a member of the community who is authorized to make changes to the replica membership list) of the community. In other words, the manager is a member of the community who is authorized to make changes to the replica membership list. In addition, managers can process such requests and make changes to the membership metadata, and then synchronize the metadata to the other users in the community. Upon receiving such membership changes, the sync component 106 allows each replica to make the necessary access changes to its data and metadata. It is to be appreciated that the creation and management of the peer to peer synchronization community implemented by the sync component 106 can allow multiple replicas and users, wherein roles assigned to each user can dynamically change at any given instant in time. In other words, there is no single fixed master in the topology of the sync component 106 and/or the peer to peer synchronized community. Moreover, the sync component 106 can leverage the underlying authentication and authorization techniques and/or mechanisms of the data storage system 102.

Moreover, the system 100 can include any suitable and/or necessary interface component 108, which provides various adapters, connectors, channels, communication paths, etc. to integrate the sync component 106 into virtually any operating and/or database system(s). In addition, the interface component 108 can provide various adapters, connectors, channels, communication paths, etc., that provide for interaction with the sync component 108, the data storage system 102, and the disparate data storage system 104.

Figure 2:
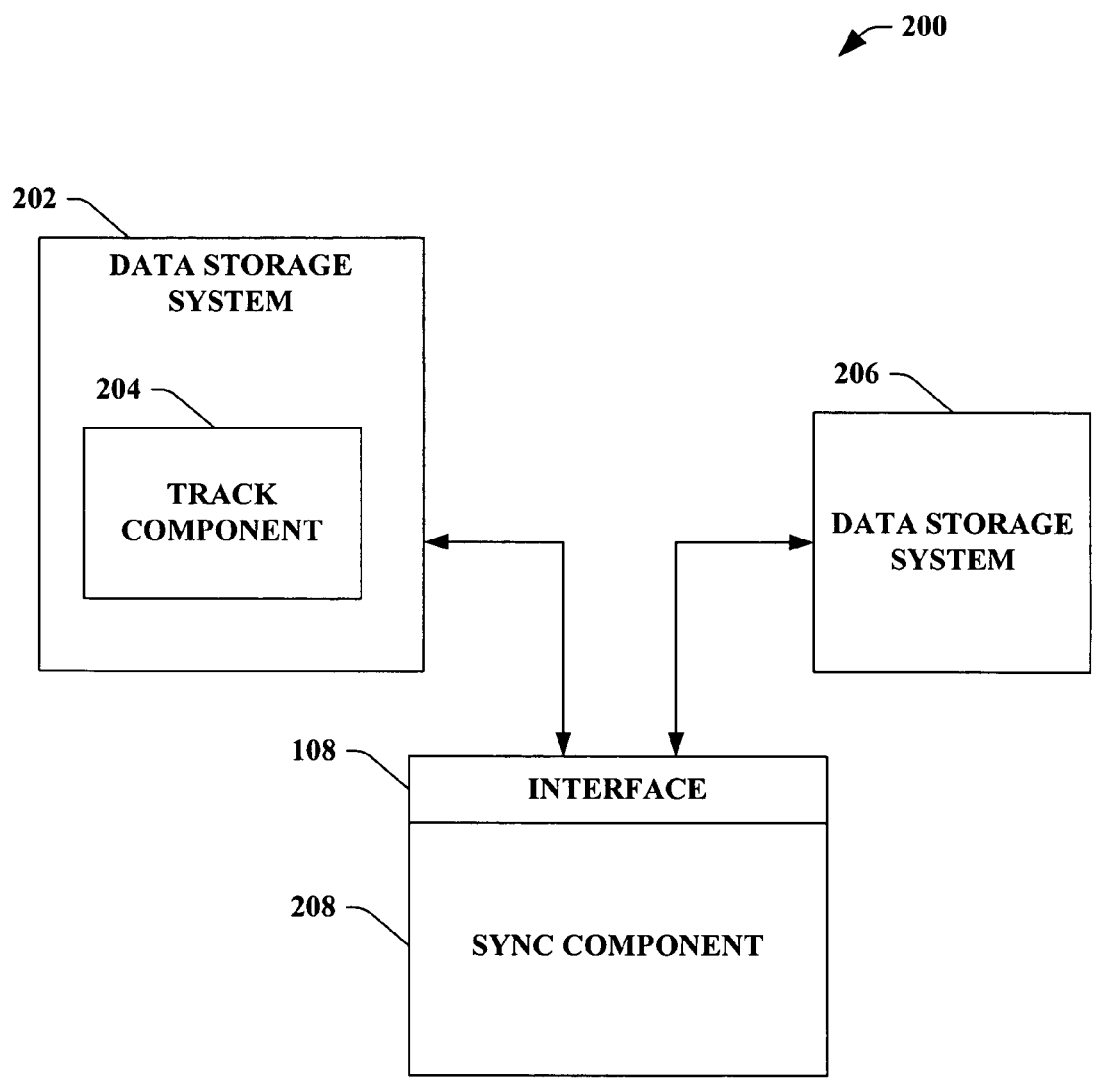
FIG. 2 illustrates a block diagram of an exemplary system that facilitates leveraging existing synchronization mechanisms within a data storage system to ensure data consistency between data storage systems.

FIG. 2 illustrates a system 200 that facilitates leveraging existing synchronization mechanisms within a data storage system to ensure data consistency between data storage systems. A data storage system 202 can be a database-based file storage system that represents instances of data as complex types by utilizing at least a hierarchical structure. An item, a sub-item, a property, and a relationship can be defined within the data storage system 202 to allow the representation of information as instances of complex types. The data storage system 202 can be a data model that can describe a shape of data, declare constraints to imply certain semantic consistency on the data, and define semantic associations between the data. The data storage system 202 can utilize a set of basic building blocks for creating and managing rich, persisted objects and links between objects.

For instance, the building blocks can include an "Item," an "ItemExtension," a "Link," and an ItemFragment." An "Item" can be defined as the smallest unit of consistency within the data storage system 202, which can be independently secured, serialized, synchronized, copied, backup/restored, etc. The item is an instance of a type, wherein all items in the data storage system 202 can be stored in a single global extent of items. An Item can be extended utilizing an extension entity such as, but not limited to, an "ItemExtension." The entity extension can be defined in a schema with respective attributes (e.g., a name, an extended item type, a property declaration, . . . ). The "ItemExtension" can be implemented to group a set of properties that can be applied to the item type that is extended. A "Link" is an entity type that defines an association between two item instances, wherein the links are directed (e.g., one item is a source of the link and the other is the target of the link). An "ItemFragment" is an entity type that enables declaration of large collections in item types and/or item extensions, wherein the elements of the collection can be an entity. It is to be appreciated and understood that the data storage system 202 can represent any suitable database-based file storage system that provides the representation of data as instances of complex types and the above depiction is not to be seen as limiting the subject invention. The data storage system 202 can be substantially similar to the data storage system 102 depicted in FIG. 1.

The data storage system can include a track component 204 that provides tracking data changes to various entities stored inside the data storage system 202, and in particular, a store within the data storage system 202. The track component 204 can capture the data change(s) to the entities to facilitate synchronizing data between two disparate systems maintaining sets of data. The track component 204 can utilize a schema that provides an infrastructure that allows a store and/or container to provide granular maintenance in relation to a data change. For instance, the track component 204 can track a data change, wherein the data change can include, an insert, an update, and a delete at the entity (e.g., item, relationship, extension, etc.) level. The track component 204 can track data changes such that at the entity level, the change tracking can be utilized to generate at least one of a notification and control with optimistic concurrency. It is to be appreciated that optimistic concurrency assumes the likelihood of another process making a change at the substantially similar time is low, so it does not take a lock until the change is ready to be committed to the data storage system (e.g., store). By employing such technique, the lock time is reduced and database performance is better.

The track component 204 can include a non-sync component (not shown) that can track data changes at an entity level within the data storage system 202. It is to be appreciated that the data changes are tracked solely at an entity level based at least in part upon the non-participation in synchronization. Tracking a data change at the entity level can be referred to as "change information." The non-sync component can capture basic change information for all entities. For instance, the basic change information can be, but is not limited to, a local creation time and a local modification time.

The track component 204 can further utilize a data storage system (DSS) synchronize component (not shown) that provides tracking for an entity that participates in synchronization. The DSS synchronize component has a more specialized requirement to track data changes to an entity at a more granular level as well as capturing and maintaining information about the store and/or container that has been changed in a multi-store replication (e.g., castle) scenario. The sync component 208 can capture addition change information for entities in a sync relationship. For instance, the DSS synchronize component can capture change information at a more granular (e.g., sub-level, sub-sub-level, etc.) to minimize the amount of data to be synchronized and to reduce the number of change conflict situations. In another example, the DSS synchronize component can capture information about which store and/or container created and/or updated entities. It is to be appreciated and understood that the claimed subject matter can apply to synchronization systems that are not based on the track component 204 (discussed above) and that any suitable synchronization system can be implemented including systems that utilize logs of at least one change (e.g., log-based synchronization systems).

A sync component 208 can provide a secure peer to peer synchronized community in relation to the data storage system 202 and a disparate data storage system 206, wherein various levels and/or tiers of access can be provided. The sync component 208 can leverage the existing track component 204 within the data storage system 202 to allow the synchronization of data stored within the data storage system 202, disparate storage system 206, and/or any other suitable machine. It is to be appreciated that the sync component 208 provides data synchronization by utilizing underlying and/or existing synchronization mechanisms associated with the various data storage systems and/or machines, wherein such data storage systems and/or machines include unsynchronized data that is to be synchronized. It is to be appreciated that the sync component 208 can be substantially similar to the sync component 106 as illustrated in FIG. 1.

Figure 3:
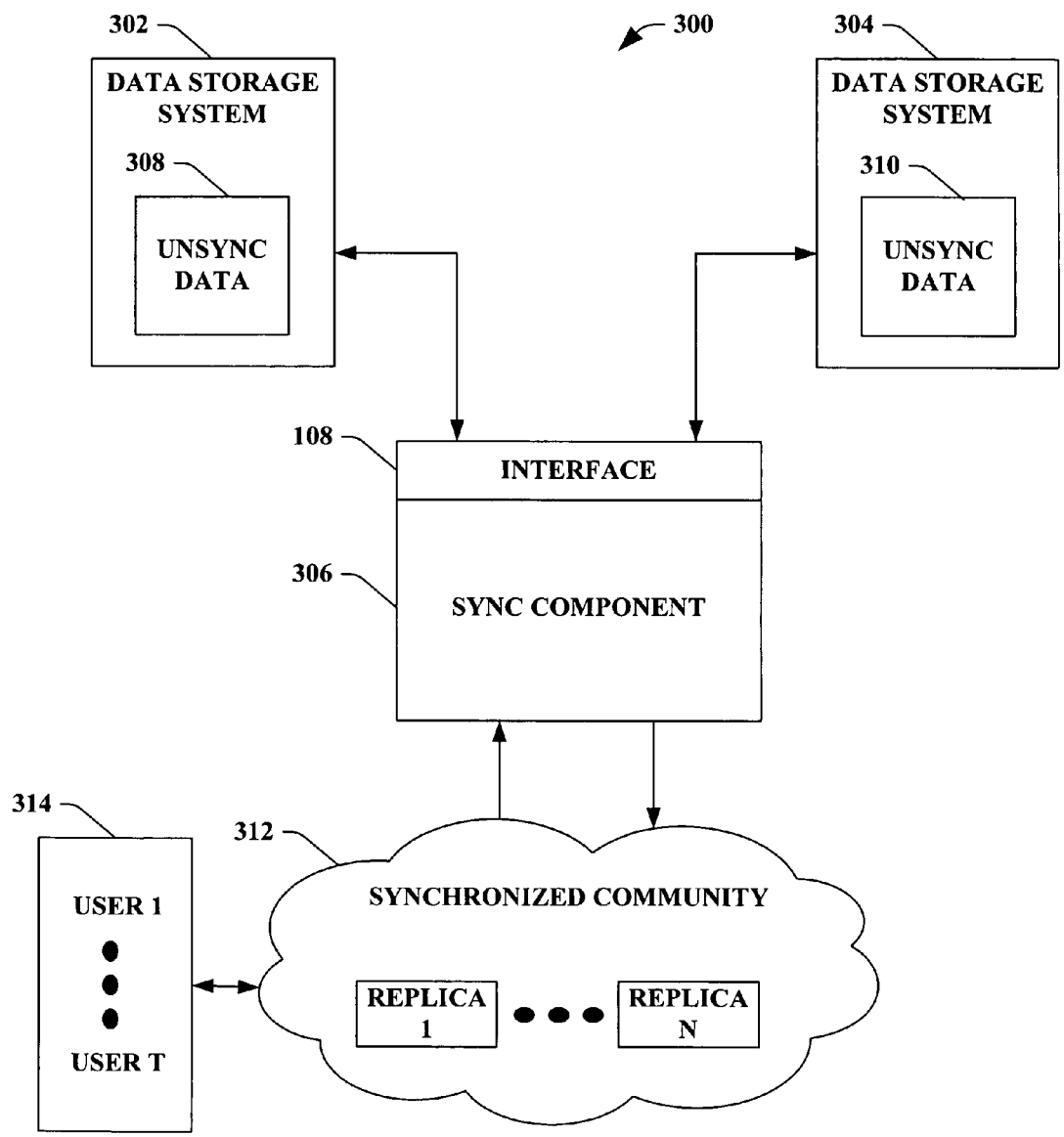
FIG. 3 illustrates a block diagram of an exemplary system that facilitates synchronizing data within data storage systems to allow multiple users to access.

FIG. 3 illustrates a system 300 that facilitates synchronizing data within data storage systems to allow multiple users to access. A data storage system 302 can be a database-based file storage system, wherein data is represented as instances of complex types. The data storage system 302 can include unsynchronized data 308 (herein referred to as unsync data 308), wherein such data is to be synchronized with a disparate storage system 304 that includes unsync data 310. A sync component 306 can synchronize such data within a peer to peer synchronized community 312. The synchronized community 312 can include a replica 1 to replica N with N being an integer greater than or equal to 1, wherein the replica is a synchronized folder and/or data associated with at least one user related to the synchronized community 312. The sync component 306 can create the peer to peer synchronized community 312, wherein multiple users 314 (having a user 1 to user T with T being an integer greater than or equal to 1) can access such replicas based on a level and/or tier associated with accessibility. It is to be appreciated that the multiple users 314 and accessibility levels and/or tiers can be based at least in part upon a membership list. Moreover, it is to be appreciated that the data storage system 302 and the sync component 306 can be substantially similar to components and systems described in earlier figures.

The sync component 306 can further provide at least one of the following: 1) validation of development experience of application built on a platform related to the data storage system 302; 2) creation of a process feedback and improvement back into the data storage system 302 and data storage system 302 synchronization; 3) creation of a self host environment for the application; 4) implementation of an end to end synchronization solution that handles issues such as, but not limited to, transport and security (including authentication and encryption), and synchronization over the Internet; and 5) investigation of points related to integration between the data storage system 302 and data storage system 302 synchronization functionality and the rest of an operating system.

For example, a user can keep multiple personal computers (PCs) synchronized utilizing the sync component 306, wherein the PCs implement a database-based file storage system substantially similar to the data storage system 302. Various containers can be synchronized with disparate computers. In particular, a shared photos container can be synchronized with disparate users across the Internet. In addition, a shared documents container can be synchronized with multiple machines at home and at work. In another example, a photo application can be implemented to provide the ability to share photos. Utilizing the sync component 306 in association with a photo application can ensure a seamless experience across the photo application and the database-based file storage system synchronization based photo sharing. In still another example, the sync component 306 can be implemented in the corporate scenario and/or environment. In a corporate environment and/or scenario, account authentication and impersonation is available, for instance, via a LAN manager or Kerberos. This is distinct from synchronization over the Internet, which introduces requirements for the transport.

Based at least in part upon the above scenarios and/or examples, the sync component 306 can provide at least one of the following: 1) set up synchronization; 2) manage synchronization data; 3) manage synchronization schedules; 4) inspect and resolve synchronization conflicts; 5) review synchronization conflicts; and 6) synchronize photos.

Figure 4:
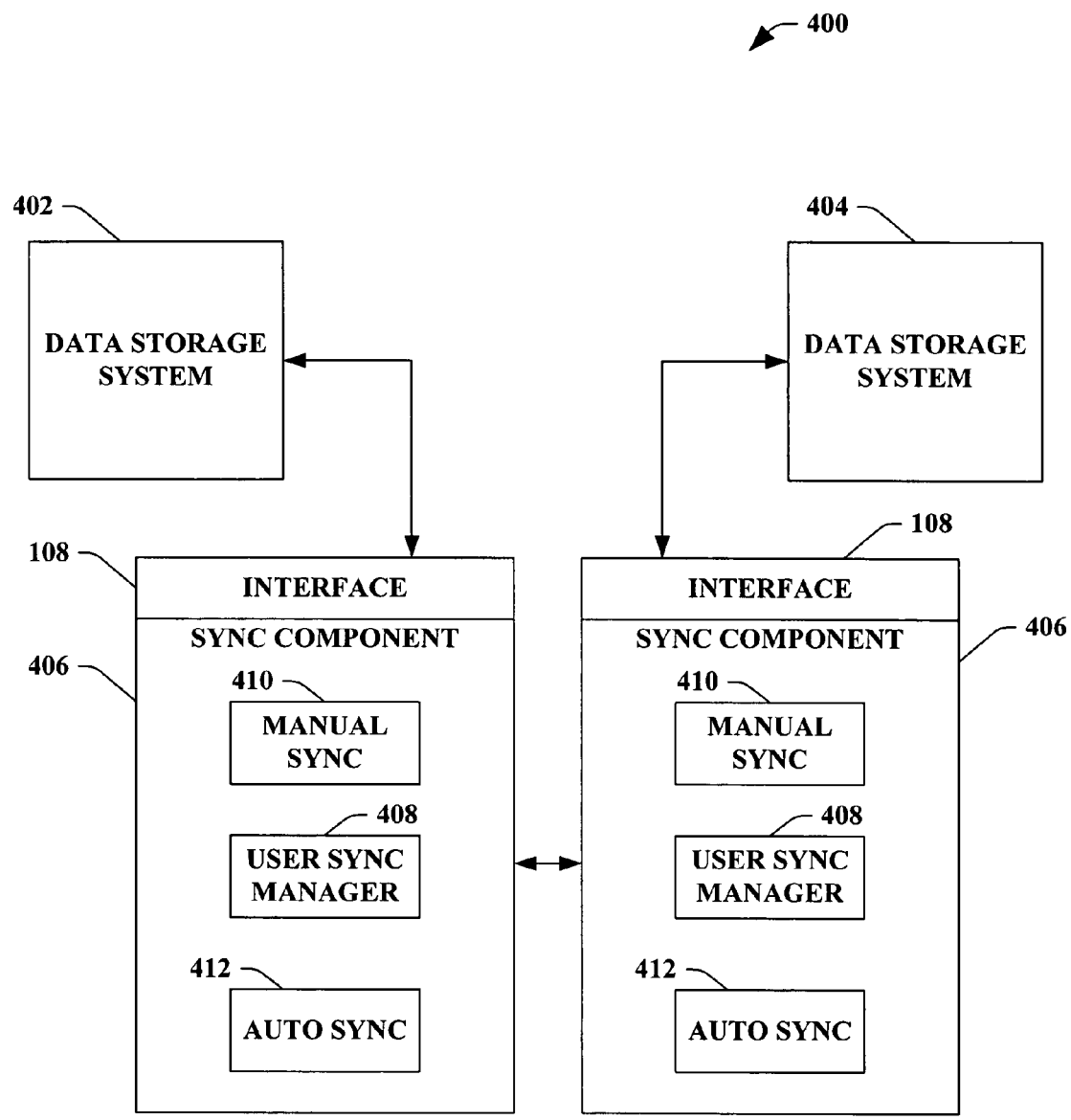
FIG. 4 illustrates a block diagram of an exemplary system that facilitates data synchronization between at least two disparate data storage systems.

FIG. 4 illustrates a system 400 that facilitates data synchronization between at least two disparate data storage systems. A sync component 406 can provide a secure peer to peer synchronized community in relation to a data storage system 402 and a disparate data storage system 404, wherein various levels and/or tiers of access can be provided. The sync component 406 can leverage the existing track component (not shown) within the data storage systems 402 and 404 to allow the synchronization of data. It is to be appreciated that the sync component 406 provides data synchronization by utilizing underlying and/or existing synchronization mechanisms associated with the various data storage systems and/or machines, wherein such data storage systems and/or machines include unsynchronized data that is to be synchronized. It is to be appreciated that the data storage systems 402 and 404 and the sync component 406 can be substantially similar to previously described systems and/or components.

The sync component 406 can include a user sync manager component 408 (herein referred to as the user sync manager 408). The user sync manager 408 can facilitate creating synchronized relationships, creating synchronized containers, inviting users, accepting invitations, joining a community, removing users, maintaining membership lists, and/or overall management of the peer to peer synchronized community. The user sync manager 408 can provide a user to enable synchronization on a container (not shown) within a data storage system in a default store. The synchronization relationship can be created to this container (e.g., for example, a container with the data storage system 402). The synchronization relationship can be created to a specific synchronized container shared by a specific user on a specific computer. It is to be appreciated that the user who created the synchronized container is aware that the container is synchronized.

As stated above, the user sync manager 408 can facilitate creation of a sync relationship. The invitation (e.g., to invite a user to join a peer to peer synchronization community) can contain the name of the inviting Manager, computer, IP address and/or any suitable identification technique, as well as the community and the scope. The roles, levels and/or tiers can be mapped to the data storage system permissions (e.g., discussed infra). These permissions can be set before the invitation is sent. The invitation can also include an initial data packet that includes the membership list, such that when the invitation is accepted, the replica can be completely set up without the need for an initial round trip. It is to be appreciated that the invitation can also include the initial data for the container.

Invitations can be created in extensible markup language (XML) files with the extension, for instance, SyncInvitation. The sync component 406 registers as the handler for these, and displays the accept invitation to synchronize dialog. These invitations can include the following properties: community name, inviting user, inviting computer name, invited user, invited user role, etc. The invitation can be, for example, an email that can include the following text: a To line (e.g., including an email address), a Subject line (e.g., including a subject informing of the invitation), a body (e.g., containing detailed human-readable information about the invitation, inviting user, inviting computer name, role, community name, etc.), an attachment (e.g., that can be double-clicked to accept the invitation), etc.

The user sync manager 408 can also create a synchronized container (not shown). In an operating system file exploring application, a user can click on a container in the default store within the data storage system 402, and select an option directed to allowing synchronization. By selecting such option, the user sync manager 408 can implement the creation of a synchronized container wizard, wherein the wizard can specify at least one of the following: 1) synchronization mode; and 2) conflict policy (all of which discussed infra).

To create a synchronized container, the following steps can be performed by the user sync manager 408. The following steps are illustrated as an example and the claimed subject matter is not so limited.
1) If this synchronized container is the first member of the community,
   a. A Data community is created, rooted at the synchronized container. This community synchronizes the data across all synchronized containers.
   b. A Security community is created, rooted at a private container under the Replica of the synchronized container. This community synchronizes the security configuration for the Data community. This includes a list of each accepted users. Also included are the permissions and address of each accepted user.
   c. A Requests community is created (e.g., discussed infra).
2) A security group is created on the local machine for each of the roles. The groups are called Reader, Writer and Manager (e.g., discussed infra). The name of each group is appended with a unique suffix to distinguish it from the corresponding security group of another synchronized container.
3) The Data container's permissions are set based on the configuration in the Security community. Specifically, the Generic Read permission is granted to Readers, and the Windows "Generic Write+Generic Read" permission is granted to Writers. Since synchronization is done directly by data storage system-data storage system sync, this secures the data to allow only the appropriate users to sync to and from the synchronized container.

The security group's permissions can also be set based on the configuration in the Security community. In particular, the operating system "Generic Write+Generic Read" permission can be granted to Managers, and generic read permission is granted to readers and writers, respectively.

The following table is an example of the security groups that can be created and the access offered to each in the various folders and share. It is to be appreciated that the following table is an example and the claimed subject matter is not so limited. Moreover, the hashes in the following table are 128 byte deterministic hashes, but such implementation is not so limited. Note: each ACE listed has container_inherit and object_inherit and the peer to peer sync application is referred to as PTPS.

| Share Location | Share Name | ACL of share | | ACL of root Item of folder (Item level security) | |
|---|---|---|---|---|---|
| Synchronized folder root | PTPS_<Root path hash> | PTPS_Managers_<Root path hash> | Full control | PTPS_Managers_<Root path hash> | Full control |
| | | PTPS_Writers_<Root path hash> | Full control | PTPS_Writers_<Root path hash> | Full control |
| | | PTPS_Readers_<Root path hash> | Generic read | PTPS_Readers_<Root path hash>: | Generic read |

| | | |
|---|---|---|
| Security Folder | PTPS_Managers_<Root path hash> | Full control |
| | PTPS_Writers_<Root path hash> | Generic read |
| | PTPS_Readers_<Root path hash> | Generic read |
| | PTPS Runner User | Full control |
| | ACL_PROTECT: This prevents the propagation of allow & deny ACES from the parent | |
| User Request folder | PTPS_Managers_<Root path hash> | Full control |
| | User that "owns" the folder | Full control |
| | PTPS Runner User | Full control |
| | ACL_PROTECT: This prevents the propagation of allow & deny ACES from the parent | |

| Security Group Name | Membership |
|---|---|
| PTPS_Managers_<Root path hash> | Managers of the synchronized folder |
| PTPS_Writers_<Root path hash> | Writers of the synchronized folder |
| PTPS_Readers_<Root path hash> | Readers of the synchronized folder |

A synchronized container can have the following structure. Note the data storage system is referred to as DSS and the peer to peer sync application is referred to as PTPS.

| | |
|---|---|
| Synchronized container | (synchronized with Data community) |
| + Replica | (not synchronized) |
| + Security folder | (synchronized with Security community) |
| + Requests folder | |

The user sync manager 408 can allow the invitation of a user to synchronize the container once a container is created and/or at any later time. The user sync manager 408 can specify a contact address (e.g., an email address, an Internet protocol (IP) address, etc.), wherein an invitation containing the invitation data can be attached. It is to be appreciated that the user sync component 408 does not require the automatic sending of the invitation since it can be sent at any time designated by the user. The recipient of the invitation can be accepted by another user based at least in part upon the user implementing the sync component 406.

In another example, the invitation can be saved as a file for later use. The user can send the invitation to the other user by any other suitable means (e.g., floppy, email, text message, short message service (SMS), etc.). The user sync manager 408 can utilize any suitable invitation mechanisms and/or techniques. Moreover, the user sync manager 408 can provide various invitation levels, wherein a user can be invited to participate in the peer to peer synchronization community in one of, but not is not limited to, roles, levels, and/or tiers: 1) Manager-read, write, modify, add, invite, revoke; 2) Writer-read, write, modify, add; 3) Reader-read; and 4) Contributor-read, add.

The user sync component 408 further provides the acceptance of an invitation. When an invitation is received and opened, the user can implement at least one of the following: 1) specify and/or create a local data storage system container to synchronize with; 2) specify whether this container can be automatically synchronized or manually synchronized; and 3) specify the conflict policy to be implemented. The display name of a user can be the name that the security system for a particular environment utilizes. For example, in a corporate environment, the display name can be the username of the logged on user. It is to be appreciated that in the Internet scenarios, the security system can utilize a different name (e.g., email alias, EP address, email address, etc.).

The security folder (discussed above) can be synchronized among the security community. The policy and permissions for this community can be that two-way synchronization can occur among managers, and one way synchronization occurs from a manager to a non-manager. The security folder can have two sub-folders that store the list of users and the list of replicas in the community:

| | |
|---|---|
| Security folder | (synchronized with Security community) |
| + Replica (of Security folder) | |
| + Users Folder | |
| + SynchronizedFolderConfiguration Item | |

The Security folder can also contain a SynchronizedFolderConfiguration item, which contains the name and description of the synchronized folder.

A Users folder can contain a list of all the users in the community, together with the set of Peers for each user. The following is one example of a users folder and the claimed subject matter is not so limited.

```
    + Users
        + User 1
            + Peer a
            + Peer b
        + User 2
            + Peer c
            + Peer d
        . . .
```

Each User can be persisted as a SerializedItem containing the following data:

```
            UserName
            UserDomain
            SID
            Role (reader | writer | manager)
```

Each user's information can be stored as a separate item based at least in part upon if it is modified by multiple managers, the LastWriterWins conflict resolution policy can be used to resolve the conflict. The user Item's namespace and display names are set to the User's SID.

The each User can contain a list of all the peers (e.g., synchronization replicas) in the community. Each Peer can be persisted containing the following data:

```
            SID of user
            Share Path (share name not needed)
            Synchronization type (automatic | manual)
```

The unit of security on at least one machine can be the User. Thus, a user synchronizing multiple machines to the same synchronized container, can have the same permissions to that container from all the machines. An important reason for storing a Peer under its User is that an item stored underneath another item (as opposed to a folder) can be always synchronized in the same transaction as its parent. This, together with the entity-merge conflict resolution policy, ensures that Users and Peers are not out inconsistent with each other.

The following can be an example of a structure for a request folder. Each non-manager peer has a single subfolder underneath the Requests container, used to store requests to and from the user and the managers, as follows.

```
+ Requests folder
    + Requests subfolder for peer owner's requests (synchronized with peer
owner and managers)
        + Replica
        + ToManager
        + FromManager
```

Moreover, Each Manager peer has one subfolder for each peer in the community (including one for the Manager itself) as follows.

```
    + Requests folder
        + Container for user 1's requests (synchronized with user 1 and
            managers)
            + Replica
            + ToManager
            + FromManager
```
```
        + Container for user 2's requests (synchronized with user 2 and
            managers)
            + Replica
            + ToManager
            + FromManager
        . . .
        + Container for user n's requests (synchronized with user n and
            managers)
            + Replica
            + ToManager
            + FromManager
```

The name of a subfolder container for a peer can be "Requests" suffixed by a unique identifier representing the peer. The Requests container can be synchronized among the Requests community. The permissions for this community allow two-way synchronization between the local container representing each replica, and the corresponding container on each Manager replica. In other words, the peer's user and the managers can have full access to the peer's container.

The policy for this community can cause at least one of the following: 1) One-way synchronization of the FromManager folder to the replica from the same folder of the corresponding Requests subfolder on each Manager replica; and 2) One-way synchronization of the ToManager folder from the replica to the same folder of the corresponding Requests subfolder on each Manager replica. The ToManager folder stores AdvertiseReplica and RequestRemoval requests. The ToReplica folder stores of CompleteRemoval requests. Requests can be created and deleted and might not be modified. Therefore, there rarely are any conflicts in the Requests community. Requests can be deleted simultaneously at multiple replicas but this can be allowed and is not a conflict.

An AdvertiseReplica request can contain the identity of a replica that has joined the community. This can be synced to all managers in the community. A manager that reads the AdvertiseReplica request can add the replica to the permissions list stored in the security community (e.g., removing any duplicates deterministically if necessary) and deletes the AdvertiseReplica request. This completes the addition of the replica to the community. An AdvertiseReplica request can also be used to communicate any replica configuration changes to the community. An example of this is when the synchronization mode of a replica changes.

A RequestRemoval request can contain the identity of the replica being removed. Such a request can be created by a replica in response to a user initiated removal of the replica. When a Manager detects that a RequestRemoval request has been synchronized into the Requests container of one of it's synchronizing replicas (e.g., other than the Requests container of its own replica), it deletes the RequestRemoval Request and writes a CompleteRemoval request to the same Requests container.

A CompleteRemoval request has no data in it, but can indicate that the replica should delete its share and role based security groups, as well as its sync metadata (the Replica beneath the Synchronized container). Such a request can be created by a Manager. This can be in response to a RequestRemoval request, or in response to a Manager-initiated removal of a user or replica. When a replica synchronizes a CompleteRemoval request into its Requests container, it deletes its share and the associated security group.

A CompleteRemoval message can be deleted after a fixed expiry period (e.g., 7 days). If the message is deleted before the replica has received it, the replica still has the sync metadata and can still attempt to sync with the community. Such a sync will fail if there are no other replicas owned by the same user in the community. Otherwise, it can succeed. The metadata for this replica can be removed by a manual step. If the user that owns the replica does not own any other replica in the community, the user is also removed from the user list. This causes the appropriate security changes to trigger on all synchronized replicas.

Users and managers that have pending removal requests can have the words "Pending Removal" in the UI of the machine that they have issued the removal request from—the UI on other machines does not reflect this (e.g., and only reflects the final removal, when that occurs). The community name ids used can be, for example, at least one of the following: Data for the data community, Security for the security community, and the user name for the ToManager and FromManager community of a user. The local and remote end points for all synchronizations can be the location of the appropriate synchronized folder. Within this folder, all community names are unique.

In another example, the user sync component 408 can allow the addition of a replica to a community by adding the user to the peer to peer synchronized community first. For instance, a user can actively join the peer to peer synchronized community, wherein various files and/or containers can be synchronized. The user can then add a computer to the community utilizing a peer to peer sync application (discussed infra) from that computer, and specifying the share to join.

Furthermore, the user sync manager 408 can allow the removal of a user, a replica, and/or a manager. It is to be appreciated that the removal of a user and/or replica by a manager can be different from the user or replica owner. A manager can remove a user or replica that is other than itself (e.g., it can also remove its own replica discussed infra). The user sync manager 408 can also provide the removal of a replica by its owner user or manager. A user can remove one replica at a time from the community. From such replica, the user can invoke removal. If the last manager replica in the community attempts to remove itself, but there are other replicas in the community, the operation can fail. This can prevent the creation of orphans in the community that have not had a chance to remove their replicas. In one example, the last manager (e.g., who is also the last user in the community) can delete the synchronized folder, data, and/or metadata.

The following relates to the removal of a user or replica by a manager that is different from the user or replica owner. To remove an individual replica, a CompleteRemoval request can be written to the Requests container of each of the replicas (e.g., whenever it becomes available). To remove all replicas for a specified user, a CompleteRemoval request can be written to the Requests container of each of the replicas (e.g., whenever it becomes available). If there are no remaining replicas for the specified user, all privileges of the user can be immediately revoked by changing the security data and triggering a sync event. This still allows the replica to receive and send data until the CompleteRemoval request can be processed. However, no other replica can attempt to send or receive data to/from the removed replica.

The following relates to the removal of a replica by its owner. A user can only remove one replica at a time from the community. From the replica, the user can invoke removal. This causes a RequestRemoval request to be written to the Requests container of the Replica. If the last Manager replica in the community attempts to remove itself, but there are other replicas in the community, the operation fails. This prevents the creation of orphans in the community that have not had a chance to remove their replicas. Otherwise, the last Manager (e.g., who is also the last user in the community) deletes all the synchronized folder metadata.

Only Managers can make changes to the Security container that will be correctly synchronized. Security settings disallow any security changes made by non-Managers from being synchronized by other users. Once changes are made or received, an application running on the manager machine wakes up to the changes and appropriately modifies the security on the Data container and its contents. As these permissions can only be modified with Administrator privileges, the application uses the peer to peer sync application service (discussed infra) to do this. The operating system share access is needed to access the data storage system data. In one example, only an Administrator can create a share. Further, in another example, only an Administrator can create a security group. Therefore, the application uses the peer to peer sync application service (e.g., peer to peer sync application) (discussed infra) to do this.

The sync component 406 can implement a topology such that there is a direct connection between every replica and manager, since managers can make security changes, and since these might not be received from a non-manager. Furthermore, each replica can regularly contact a manager to receive the latest security changes. If a replica cannot contact a manager for a certain period of time (e.g., based at least in part upon a heartbeat timeout period) it can enter a state where no further data changes can be accepted until it can receive the security configuration from a manager. In addition, a user interface (not shown) can indicate which users have been successfully synchronized with. If a replica can not be contacted, its icon displayed with an overlay can indicate this fact. The user interface can also allow the user to visualize any synchronized container that they own. In addition, in a data storage system explorer application, an overlay icon can identify the container as a synchronized container.

The sync component 406 can include a manual sync component 410 (herein referred to as the manual sync 410) that provides a manual synchronization of data, files, and/or containers. Manual synchronization is intended for users that do not want their data synchronized (either read from or written to) unless explicitly invoked. The membership list includes the synchronization mode for each replica. Other replicas will not attempt to synchronize with a replica that synchronizes manually. A manual synchronization is initiated by a user. This triggers a synchronization event (discussed infra).

The sync component 406 can include an auto sync component 412 (herein referred to as the auto sync 412) that provides automatic synchronization to a file and/or container elected to the peer to peer synchronization community. Automatic synchronization can employ full-mesh sync for each of the Data and Security communities. Each replica can sync to other replica it is permitted to sync with. Local changes to the data container are detected by the application on the local machine by means of a data storage system watcher (not shown). The watcher can be programmed to avoid being triggered by data storage system sync changes. A synchronization event is triggered when the watcher fires.

Figure 5:
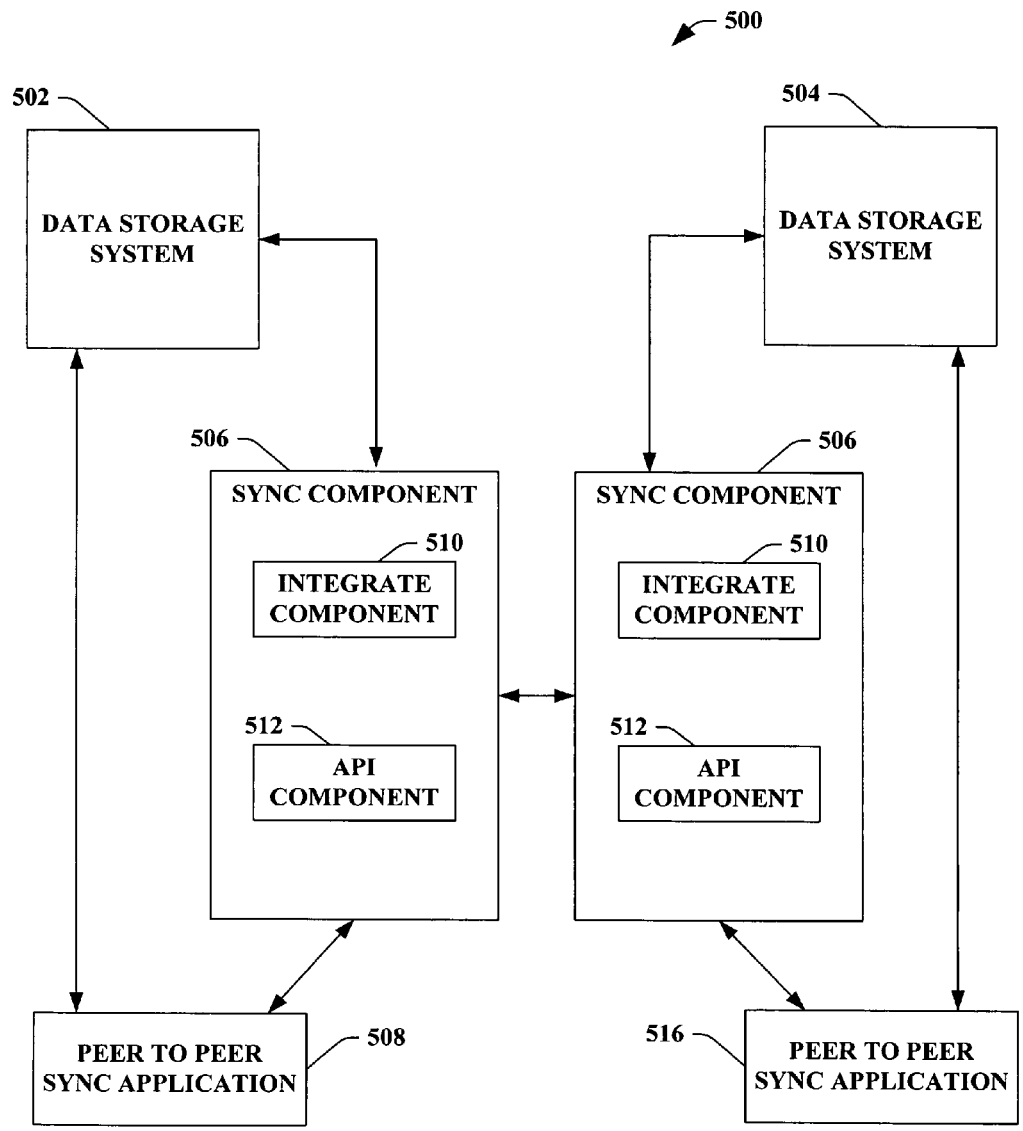
FIG. 5 illustrates a block diagram of an exemplary system that facilitates synchronizing data within data storage systems to allow various levels of accessibility.

FIG. 5 illustrates a system 500 that facilitates synchronizing data within data storage systems to allow various levels of accessibility. A sync component 506 can provide a secure peer to peer synchronized community in relation to a data storage system 502 and a disparate data storage system 504, wherein various levels and/or tiers of access can be provided. The sync component 506 can leverage the existing track component (not shown) within the data storage systems 502 and 504 to allow the synchronization of data. It is to be appreciated that the sync component 506 provides data synchronization by utilizing underlying and/or existing synchronization mechanisms associated with the various data storage systems and/or machines, wherein such data storage systems and/or machines include unsynchronized data that is to be synchronized. It is to be appreciated that the data storage systems 502 and 504 and the sync component 506 can be substantially similar to previously described systems and/or components.

The sync component 506 can further utilize a peer to peer sync application 508 that can run as a local system that exposes at least one operation to an application executing on the system. Such operations can be accessed by processes on the same machine (e.g., to prevent attacks from other computers). For instance, the peer to peer sync application 508 can be installed along with the rest of the sync component 506 by an administrator. It is to be appreciated that the peer to peer sync application 508 can run an instance associated with each data storage system and/or computer. Thus, the peer to peer sync application 508 is an instance associated with the data storage system 502 and the peer to peer sync application 516 is an instance associated with the data storage system 504. Moreover, it is to be appreciated that for simplicity, the peer to peer sync application 508 is depicted yet the peer to peer sync application 516 can also include such aspects.

The peer to peer sync application 508 can implement a string CreateShare (container). This operation creates a share at the specified container (which can be inside the data storage system) and also creates the appropriate permissions and adds the permissions for these groups to the container and to the share. The operation returns the full UNC path to the created share. This operation checks that the user is the owner of the container, and fails if this is not the case. Thus, the security provided by this API is that only the owner of the container is allowed to share it.

This weakens the security provided by the OS, which disallows the owner of a container from creating a share unless the owner also happens to be an Administrator. However, this is acceptable, as Share level security is more of a holdover from previous versions of operating systems that did not have folder level security.

The peer to peer sync application 508 can implement a SetPermissions (container). This operation validates that the calling user is the owner of the container and fails if this is not the case. This operation sets the appropriate group memberships based on the permissions in the permissions list stored in the Security container. For security, the caller does not explicitly state the groups or the ACLs; these are inferred from the container and the permissions list.

The peer to peer sync application 508 can implement a RemoveShare (container). This operation validates that the calling user is the owner of the container and fails if this is not the case. This operation deletes the share created on the container and also deletes the security groups associated with the share.

The peer to peer sync application 508 can be designed to live as an application that can be running in the system tray. The peer to peer sync application 508 can be an application that is responsible for scheduling synchronization and providing progress notification and other data such as conflicts. Moreover, the peer to peer sync application 508 is also registered as the handler for invitation requests. The context menu contains the following menu item: 1) Options; and 2) Exit.

The peer to peer sync application 508 can create a subscription for notifications on data changes in a container (e.g., a watcher), wherein the watcher can be at least one of the following: 1) Creation of synchronized folders and users. A single store-wide watcher looks for the creation, modification and deletion of NonSynchronizedItems. The handler looks for items named "SynchronizedFolderCreationMarker" This indicates that a synchronized folder has been created; 2) Each synchronized folder has a watcher that monitors the synchronized folder for data changes; and 3) Each synchronized folder has a watcher on the Data replica that monitors the synchronized folder for application metadata changes. Recall that the peer to peer sync application metadata is stored underneath the Data replica. For example, if there are two synchronized folders on the same computer, the total number of watchers is 1+2+2=5 watchers.

The peer to peer sync application 508 can further utilize at least one of the following threads: 1) UI thread. This services the system tray icon, context menu, etc. There is no exception handler for this thread; 2) Activity Log thread. This displays the activity log UI. There is no exception handler for this thread; 3) Thread pool. This is currently just one thread. All callbacks eventually execute sequentially on this thread. The exception handler for this thread re-initializes the sync controller. This typically executes in situations such as the user manually deleting a synchronized folder; and 4) Watcher threads—these are not directly created by the application. Each watcher can create one thread.

The peer to peer sync application 508 can implement a scheduling algorithm. When a synchronized folder is created, the creation Watcher fires. The handler can implement at least one of the following: 1) Schedules a Data sync after a startup delay; 2) Creates a watcher on the Data replica to watch for changes to the Requests and Security subfolders; and 3) Schedules a sync of the Security folder after a startup delay.

When a change occurs to the Security or Requests subfolders, the watcher on the Data replica fires. The handler can implement at least one of the following: 1) For each incoming requests in a Requests subfolder: a) Processes the requests (described supra); b) For local changes, schedules a sync of the Requests subfolder; 2) Updates the security permissions on the replicas; and 3) For local changes, schedules synchronization of the Security subfolder. When a change occurs to the Data subfolder, the watcher on the container fires. If the change is a local change, the handler schedules a sync of the data community. After the data community is synchronized, a time-based sync is scheduled for the data community. After the security community is synchronized, a time-based sync is scheduled for the security community. After the requests subfolder is synchronized, a time-based sync is scheduled for the requests subfolder.

The sync component 506 can include an integrate component that facilitates integration between the sync component 506 (e.g., and in particular the peer to peer sync application 508) into an operation system with other applications. This application is designed to expose most of its user interface through existing applications, such as an operating system file explorer.

A local data storage system container in the operating system file explorer can have various menu items. If the container is not a synchronized folder, two menu items can be added, such as, but not limited to, the following: 1) "Synchronize . . . ": This brings up the Synchronize dialog which allows the synchronized folder to be created, etc.; and 2) "Join Synchronized Folder . . . ": This brings up the Join Synchronized Folder Dialog. If the container is a synchronized folder, the "Synchronize . . . " menu item also appears in place of the "Allow Synchronization . . . " menu item. If there are any logged conflicts on the container, a "Resolve Conflicts . . . "

menu item can appear which opens a separate explorer window that displays the Conflicts virtual container added by the namespace extension.

Figure 7:
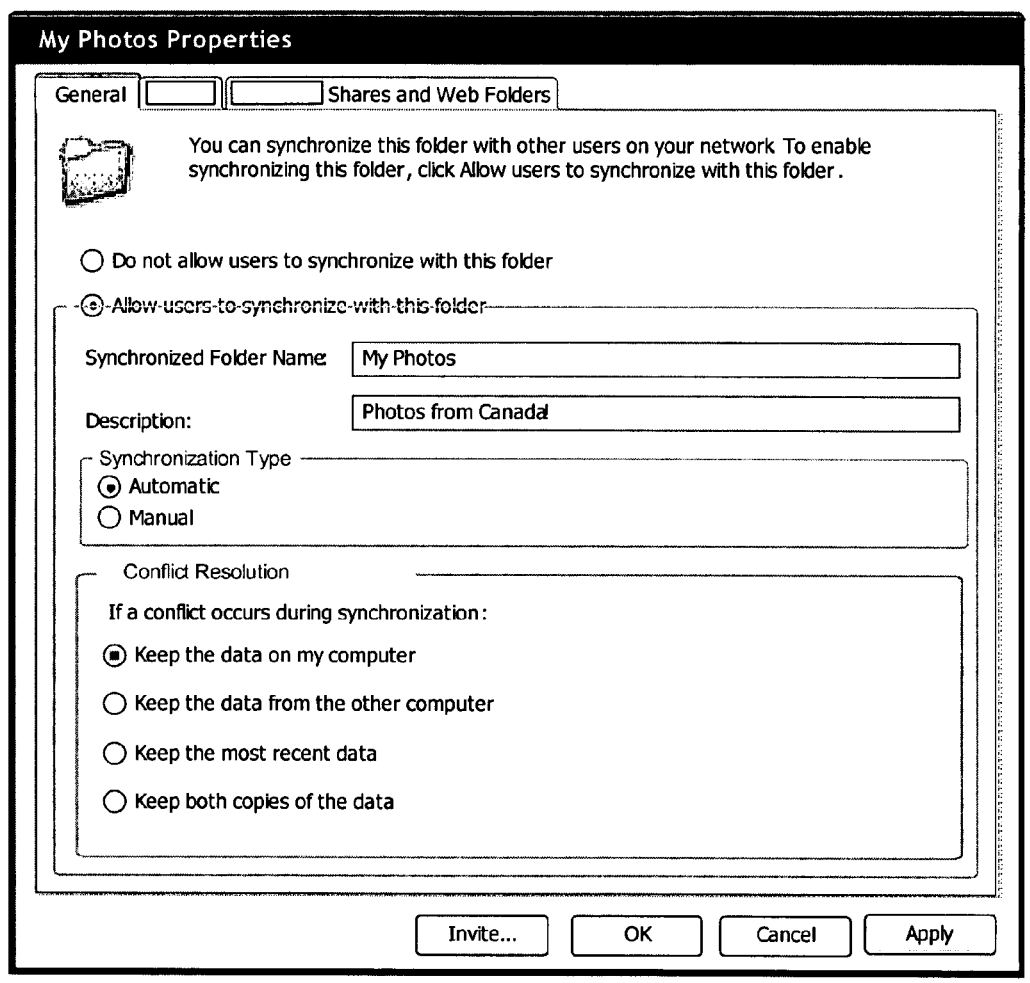
FIG. 7 illustrates a screen shot related to the claimed subject matter.

Turning briefly to FIG. 7, a screenshot 700 is illustrated that provides creation of a new synchronized folder (e.g., synchronized folder dialog). This dialog is used to create a new synchronized folder, or to manage an existing synchronized folder, as well as to stop synchronizing a folder. The Synchronization dialog contains a property sheet and a General tab, as well as tab for each add-in, such as the data storage system add-in and the operating system Shares and Web Folder add-in. The Invite button is located at the bottom of the sheet, and is active when the synchronized folder is set up for synchronization.

In one example, the dialog box can be invoked on a folder that is not a synchronized folder. In such an example, at least one of the following can be implemented: 1) The "Allow users to synchronize with this folder" check box is checked; 2) The "Do not allow users to synchronize with this folder" check box is disabled; 3) The Synchronized Folder name edit box is read/write; 4) The Description edit box is read/write; 5) The Settings, OK, Cancel and Apply buttons are available; 6) The controls in the Synchronization Type and Conflict Resolution groups are disabled; and 7) All the controls in the Users group box (in the tab) can be disabled. The user can type a name and description, and can specify the settings on the folder. At that Apply must be clicked to create the synchronized folder.

In another example, the management of an existing synchronized folder can be implemented. For instance, if the dialog box is invoked on a folder that is an existing synchronized folder, at least one of the following can be performed: 1) the "Allow users to synchronize with this folder" check box is checked; 2) The "Do not allow users to synchronize with this folder" check box is disabled; 3) The Synchronized Folder name edit box is read-only. This is because the name is a community-wide identifier; 4) The Description edit box is read/write; 5) The Settings, OK, Cancel and Apply buttons are available; 6) The controls in the Synchronization Type and Conflict Resolution groups are enabled; and 7) All the controls in the Users group box (in the tab) can be enabled.

To delete a synchronized folder, the user can check the "Do not allow users to synchronize with this folder" check box. At this point all the other controls except OK and "Allow users to synchronize with this folder" are disabled. When OK is clicked, a confirmation dialog appears, and the synchronized folder is removed. The data storage system container and all its data remain intact. Only the sync replica and other synchronized folder metadata can be removed.

Figure 8:
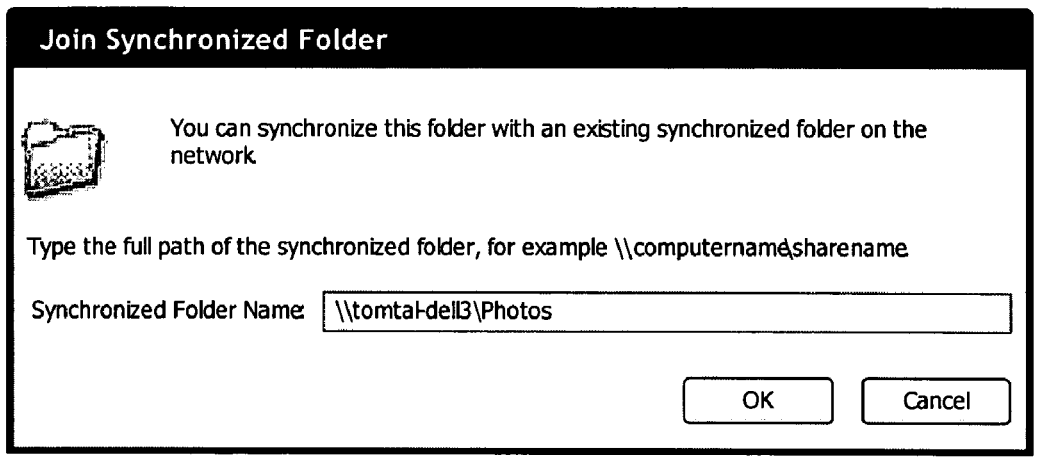
FIG. 8 illustrates two screen shots related to the claimed subject matter.
Figure 8:

The integrate component 510 can further provide dialog relating to joining a synchronized folder. Turning briefly to FIG. 8, a screenshot 800 is illustrated that provided the joining of a synchronized folder in accordance with the claimed subject matter. The screenshot 800 allows for an input of a synchronized folder name, wherein if the dialog processes the join request without error, a screenshot 810 can be displayed. The screenshot 810 informs the particular folder is synchronized and any roles associated therewith. In one example, if the user selects "Manage" the currently opened dialog boxed can be closed and the synchronized dialog can appear.

Figure 9:
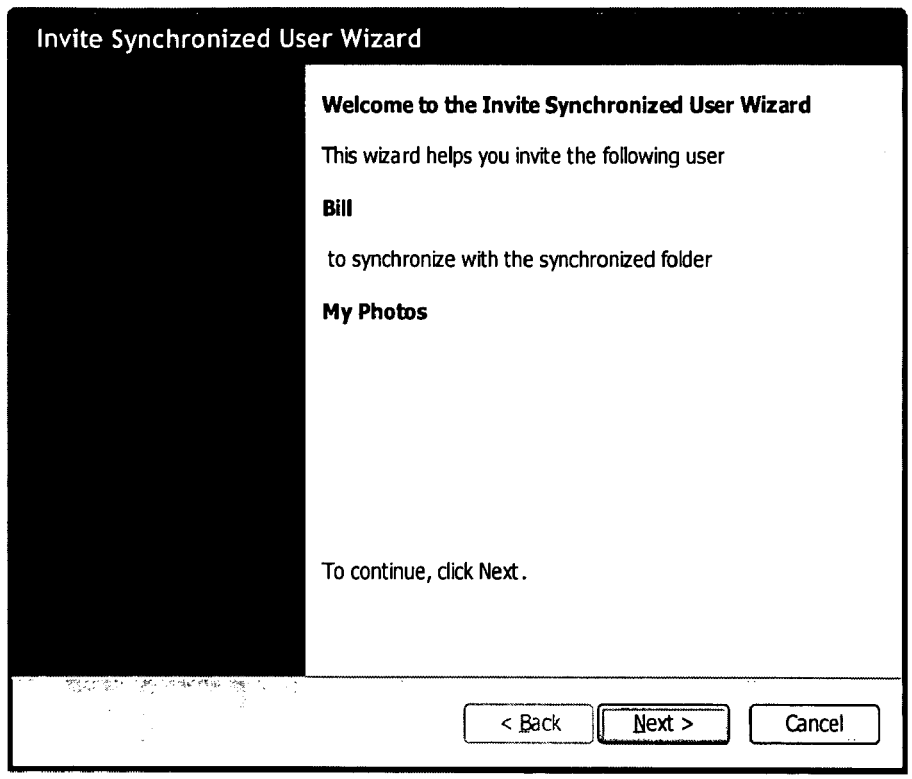
FIG. 9 illustrates two screen shots related to the implementation of a wizard application.
Figure 9:
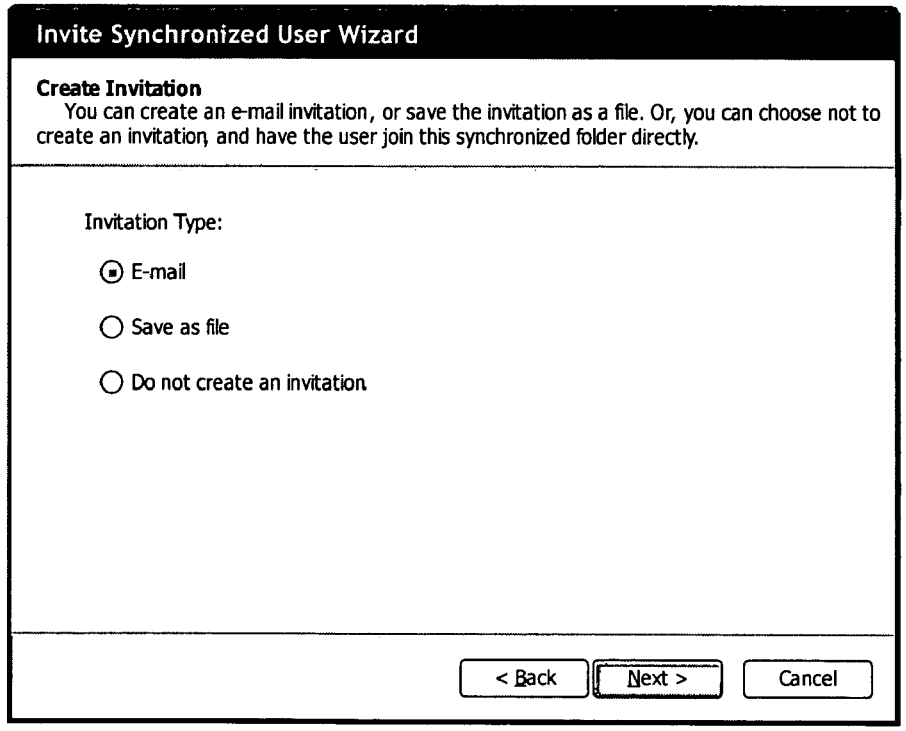

Moreover, the integrate component 510 can implement a wizard application to facilitate utilizing the sync component 506 to provide a secure peer to peer synchronized community. Turning briefly to FIG. 9, a screenshot 900 is displayed wherein a wizard application can allow the invitation of a disparate user and the synchronization of a particular data, folder and/or container. A screenshot 910, allows a user to select the invitation technique to implement with the particular synchronization.

Figure 10:
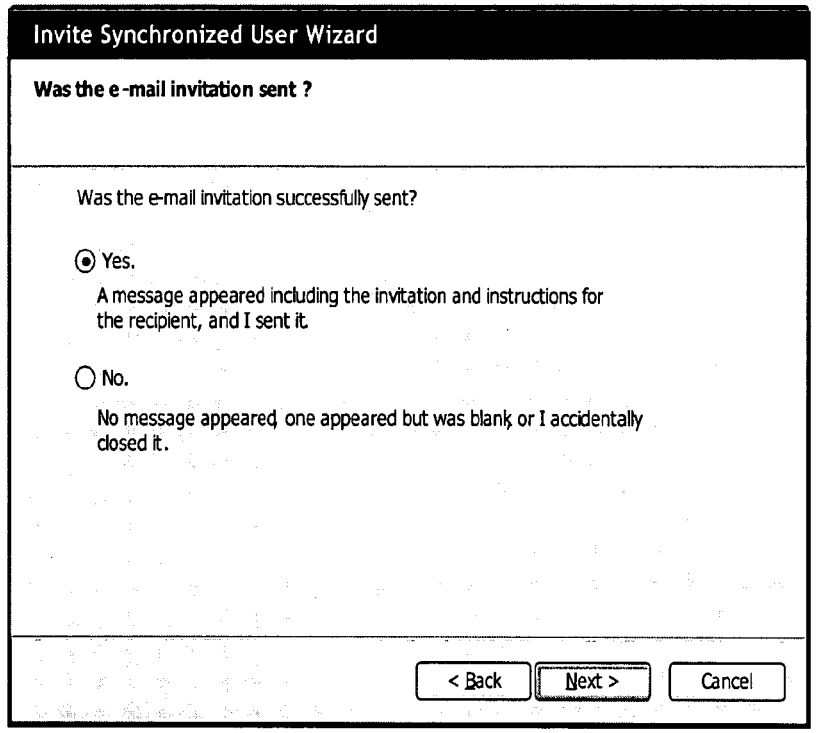
FIG. 10 illustrates two screen shots related to the implementation of a wizard application.
Figure 10:
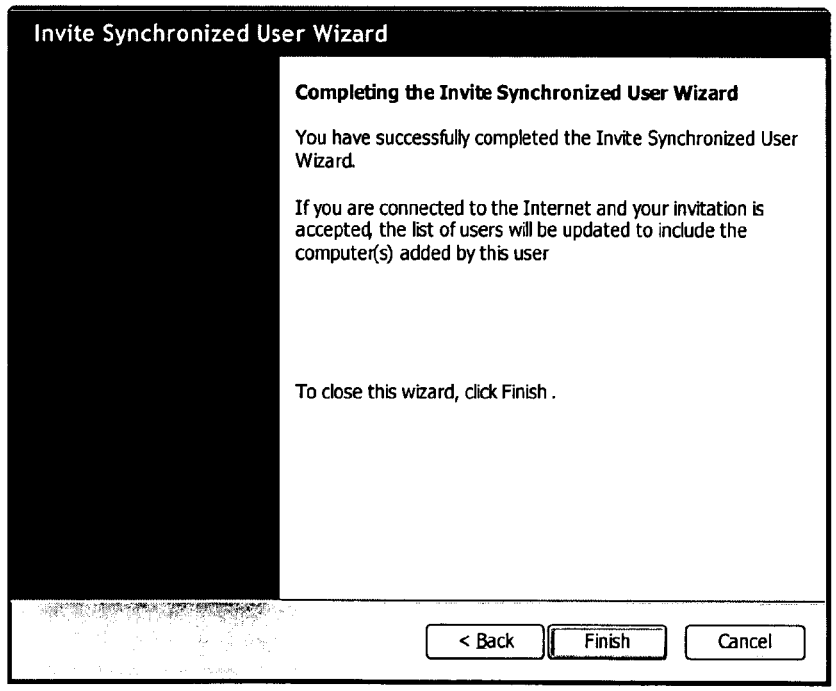

If the user selects to invite by email, an email invitation can be created with text and an email with an invitation attachment. Turning briefly to FIG. 10, a screenshot 1000 illustrates email invitation sent confirmation. In addition, a screenshot 1010 illustrates the completion of the invite synchronization user wizard application implemented by the integrate component 510.

Figure 11:
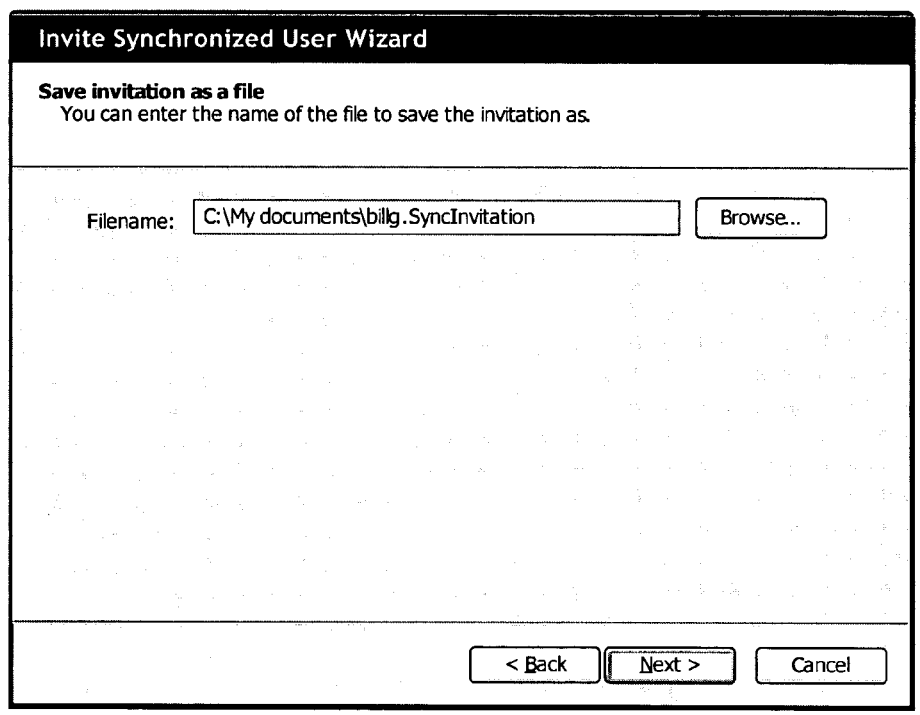
FIG. 11 illustrates a screen shot related to the implementation of a wizard application.
Figure 12:
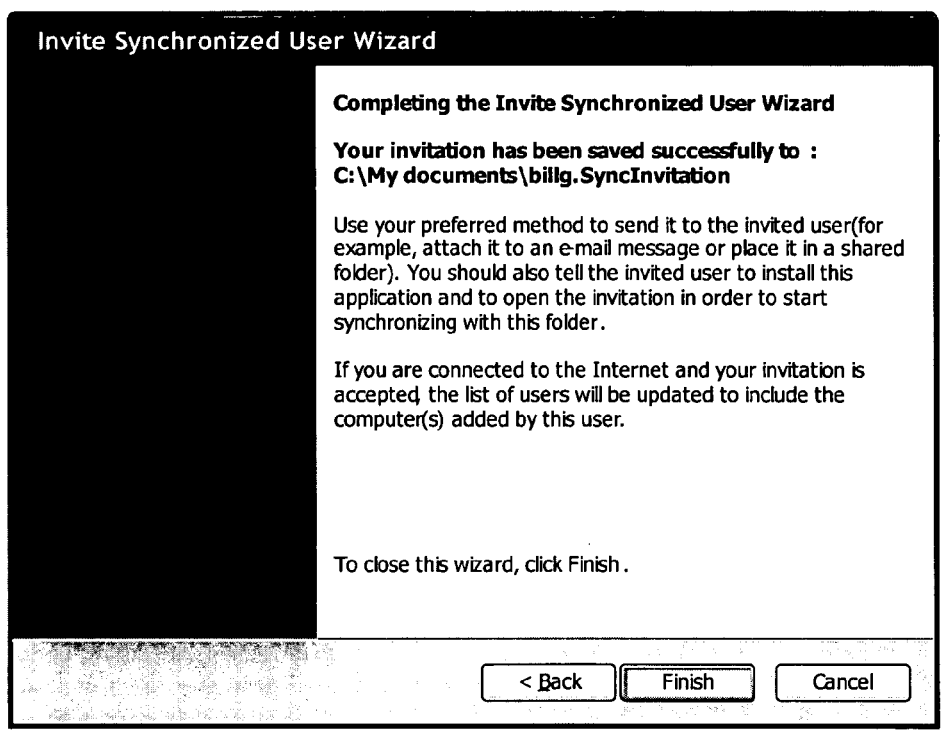
FIG. 12 illustrates a screen shot related to the implementation of a wizard application.
Figure 13:
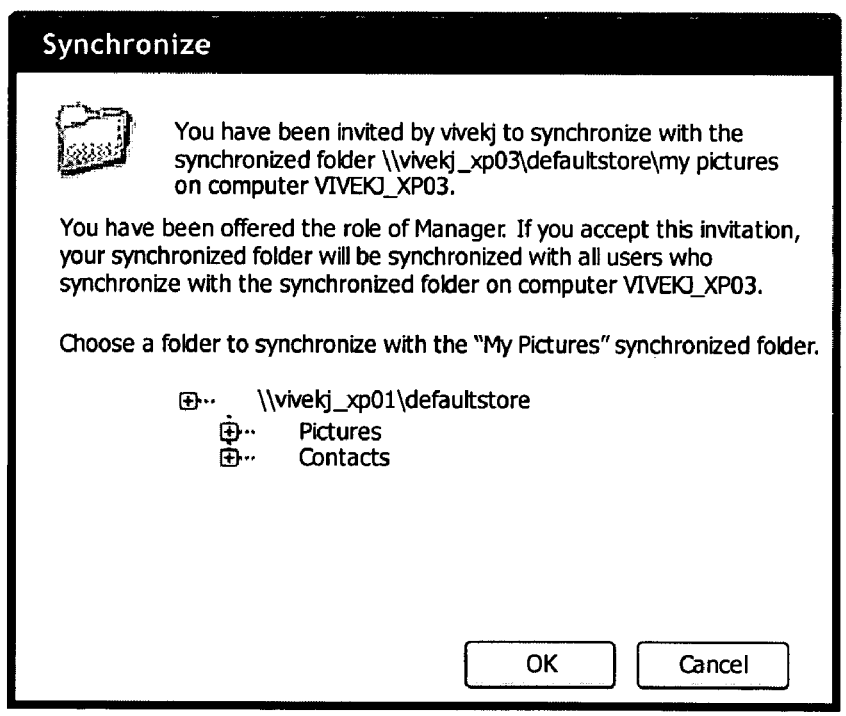
FIG. 13 illustrates a screen shot related to the claimed subject matter.

Briefly referring to FIG. 11, a screenshot 1100 illustrates a wizard application screen that can be displayed when the user selects to save the invitation as a file. It is to be appreciated that the filename, location, and/or extension can be selected from any suitable type associated with the operating system. Referring to FIG. 12, a screenshot 1200 illustrates the verification of the user completion of saving the invitation to a location within the invite synchronized user wizard application. FIG. 13 is a screenshot 1300 that allows a user to accept the invitation (e.g., accept invitation dialog). The user can click on an invitation (e.g., from email, from attachment, etc.), wherein the user can choose a folder to be synchronized with the synchronized folder. As in the screenshot 1300 depicts, the user can choose any suitable folder to synchronize with a particular folder that is already synchronized.

Figure 14:
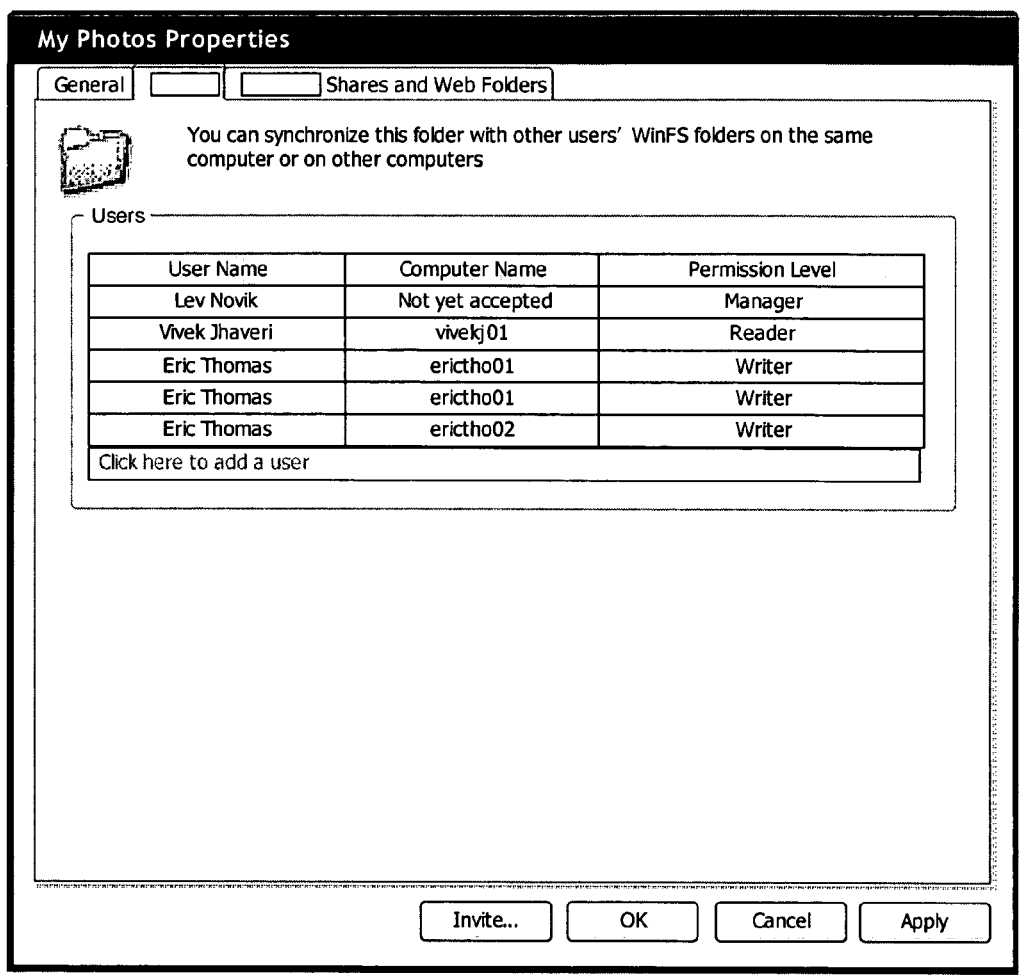
FIG. 14 illustrates two screen shots related to the claimed subject matter.
Figure 14:
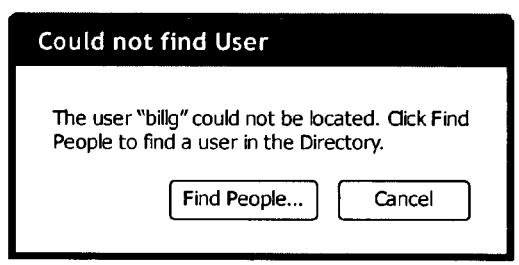
Figure 15:
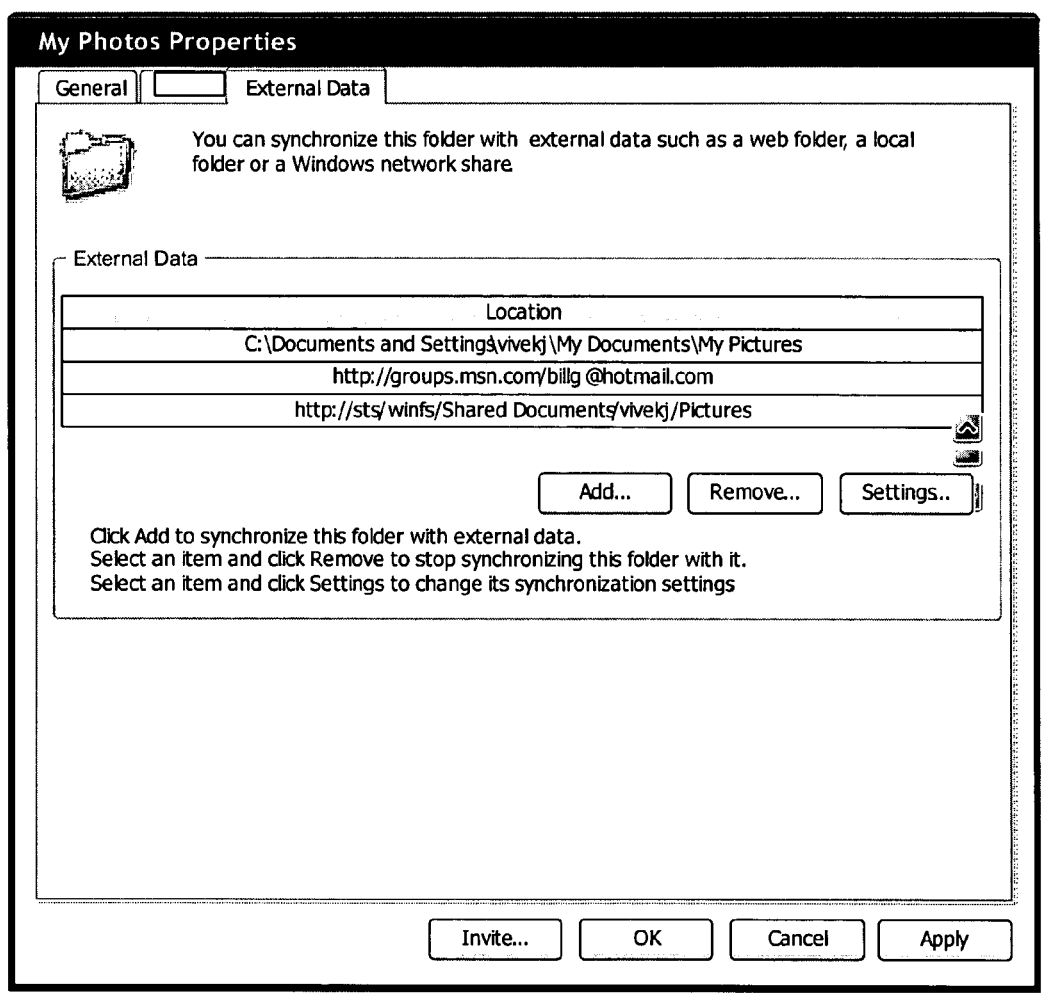
FIG. 15 illustrates a screen shot related to the claimed subject matter.
Figure 16:
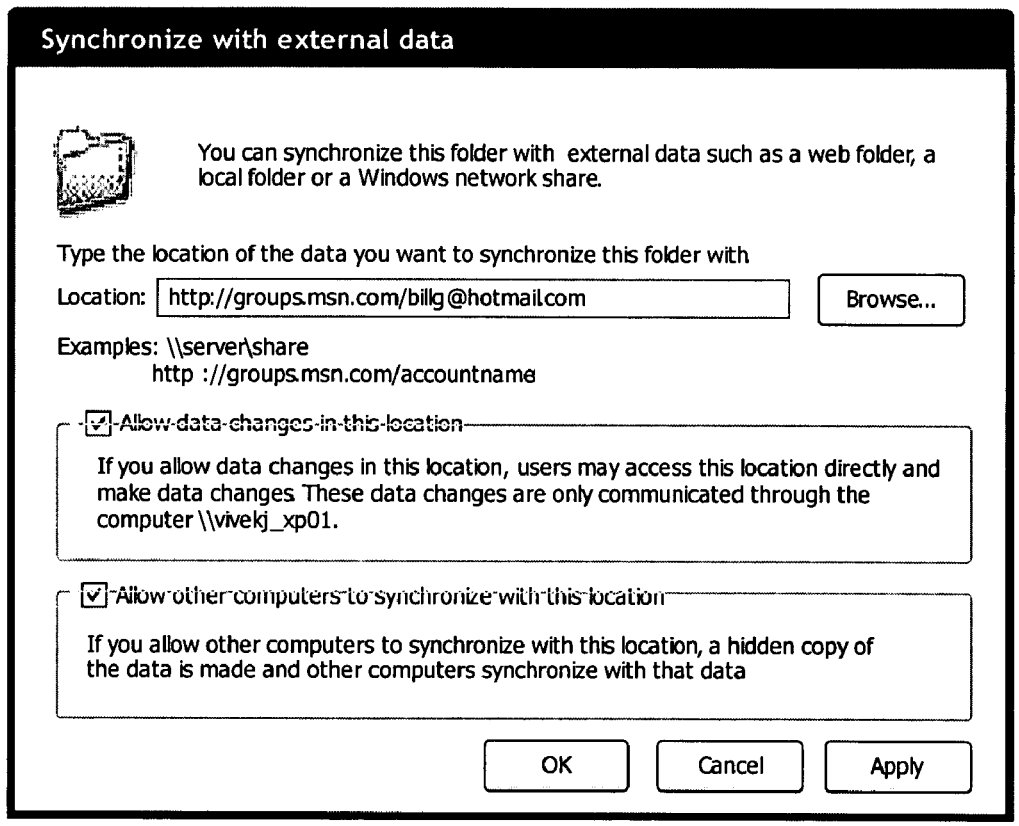
FIG. 16 illustrates a screen shot related to the claimed subject matter.

Turning to FIG. 14, a screenshot 1400 is illustrated that implements a data storage system add in, wherein data storage system synchronization functionality can be factored in as an add-in. The screenshot 1400 depicts user names, computer names, and various permission levels (e.g., tiers, access, etc.). Continuing with FIG. 14, a screenshot 1410 illustrates a "could not find user" screen that displays to a user when a requested user is not found. To add a user, the user can click on the text that reads "Click here to add user." The user then types the name of the invited user. The user name can be entered in any suitable way. For example, the name can be entered by at least one of the following: 1) domain\alias (e.g., Redmond\billg); 2) alias (e.g., billg, wherein a pop up error can be implemented if the alias does not uniquely resolve); and 3) name (e.g., Bill Grable). The user can hit an Escape key to cancel the operation. When the enter key is pressed, the user name can be resolved. Within the screenshot 1410, if find people is clicked, the "Could not find User" dialog can be closed and the user picker is displayed. User names cannot be edited once user names are resolved. Users can be deleted completely (e.g., a confirmation dialog appears). Users can be added with the default permission level of "Reader."

When a Manager right clicks on a line for a user, a context menu with choices can be displayed (e.g., reader, writer, manager, remove, etc.). The current role of the user can be checked. When a User right clicks on a line for another user or replica, no menu is displayed. When a user clicks on the line for the current replica, a menu containing just the Remove menu item is displayed. It is to be appreciated that there can be multiple replicas (e.g., user/computer pairs) corresponding to a given user. There can also be multiple replicas corresponding to a given user/computer pair. This corresponds to multiple enlistments.

Invitations can be from an end point to a user. For sync-through-intermediary (STI) it makes sense to have the at least one of the following choices: 1) Create an invitation to sync with the STI endpoint as well as with all data storage system endpoints. This is reasonable if the recipient is connected to all endpoints. In this case the STI endpoint gets updated immediately whenever the recipient's data changes; and 2) Create an invitation to sync with the STI endpoint only. In this case, the other recipients are unknown. When an invitation is accepted, the synchronized folder is created as usual. An AdvertiseReplica message is created as well. The connect handshake proceeds.

The sync component 506 can further include an application programming interface (API) component 512 that exposes at least one operation associated with the sync component 506. The API component 512 can perform synchronized folder creation and/or management programmatically. For instance, the API component 512 can implement a namespace.OS.storage.synchronization.selfhost. The API component 512 can utilize various pseudo code, wherein Appendix A is an example of such pseudo code that provides programmability to the claimed subject matter.

Figure 6:
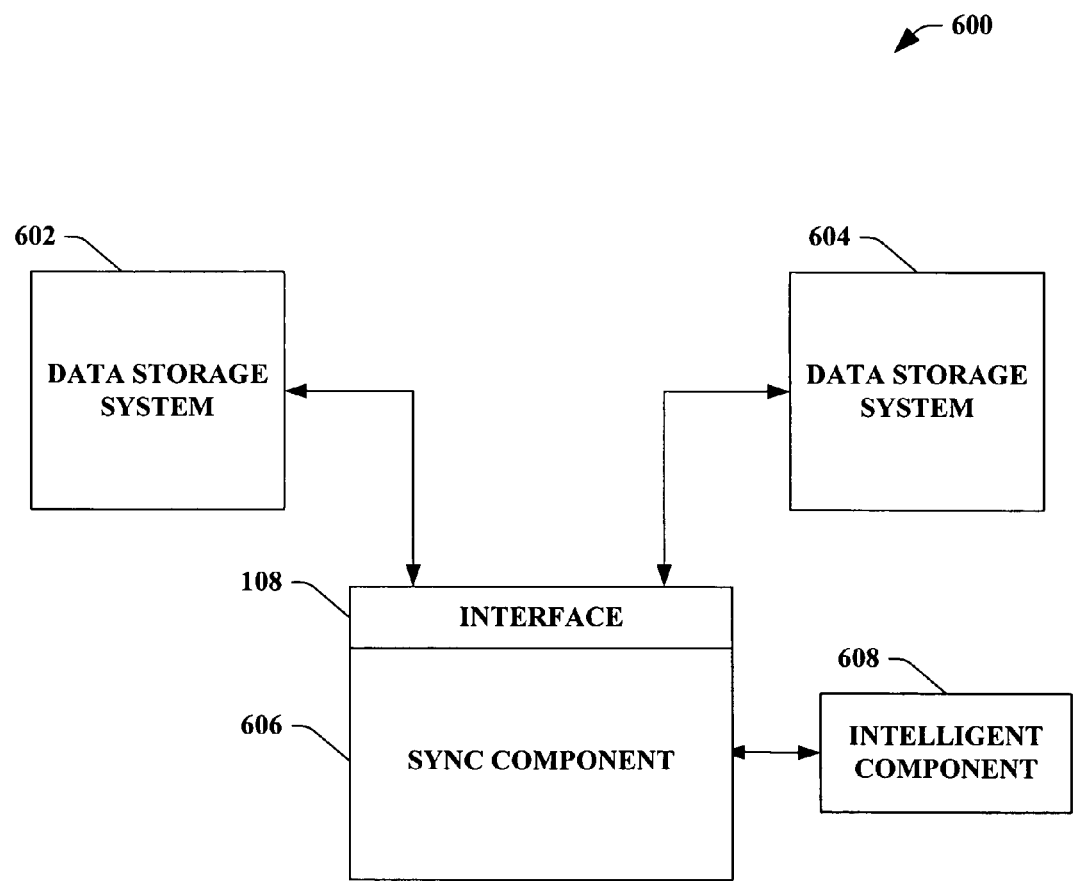
FIG. 6 illustrates a block diagram of an exemplary system that facilitates synchronizing data associated with at least two disparate data storage systems.

FIG. 6 illustrates a system 600 that employs intelligence to facilitate synchronizing data associated with at least two disparate data storage systems. The system 600 can include a data storage system 602, a disparate data storage system 604, and a sync component 606 that can all be substantially similar to respective components, and systems described in previous figures. The system 600 further includes an intelligent component 608. The intelligent component 608 can be utilized by the sync component 606 to facilitate synchronizing data associated with at least two disparate data storage systems.

It is to be understood that the intelligent component 608 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 17:
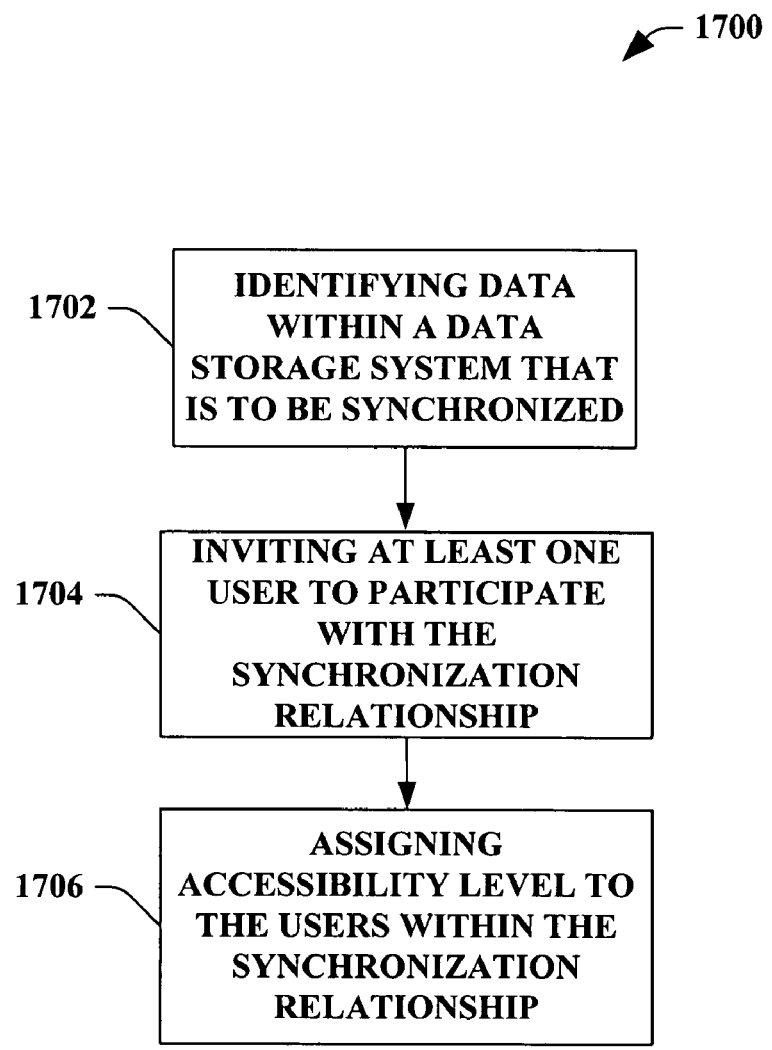
FIG. 17 illustrates an exemplary methodology for synchronizing data associated with at least two disparate data storage systems.
Figure 18:
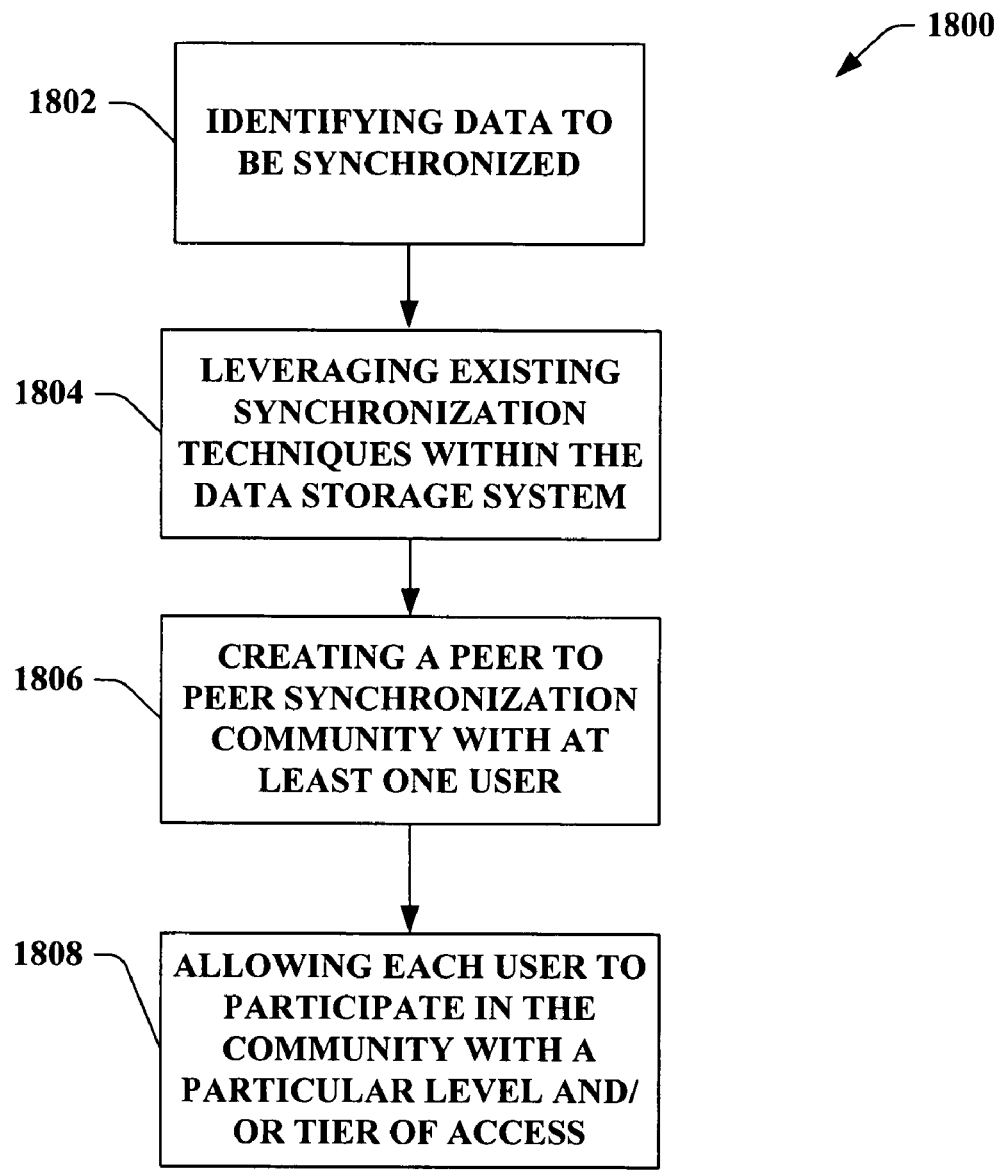
FIG. 18 illustrates an exemplary methodology that facilitates leveraging existing synchronization mechanisms within a data storage system to ensure data consistency between data storage systems.

FIGS. 17-18 illustrate methodologies in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events.

FIG. 17 illustrates a methodology 1700 for synchronizing data associated with at least two disparate data storage systems. At reference numeral 1702, data within a data storage system can be identified that is to be synchronized and/or participate in a synchronization relationship. The data storage system can be a complex model based at least upon a database structure, wherein an item, a sub-item, a property, and a relationship are defined to allow representation of information within a data storage system as instances of complex types. The data storage system can utilize a set of basic building blocks for creating and managing rich, persisted objects and links between objects. An item can be defined as the smallest unit of consistency within the data storage system, which can be independently secured, serialized, synchronized, copied, backup/restored, etc. The item is an instance of a type, wherein all items in the data storage system can be stored in a single global extent of items. The data storage system can be based upon at least one item and/or a container structure. It is to be appreciated that the data storage system can represent a database-based file storage system to support the above discussed functionality, wherein any suitable characteristics and/or attributes can be implemented. It is to be appreciated that the data can be identified by, for instance, a user that wishes to synchronize a particular portion of data.

At reference numeral 1704, at least one user can be invited to participate in a synchronization relationship associated with the identified data. For example, a user can identify a portion of data in which a synchronization relationship can be instantiated by inviting a laptop to participate. Thus, the user can invite utilizing any suitable technique, such as, but not limited to, email, IP address, username, alias, name, etc. At reference numeral 1706, the tiers and/or levels of accessibility can be assigned to various users within the synchronization relationship. For instance, a manager can create a synchronization relationship, wherein various read, write, and/or add functions can be assigned to users.

FIG. 18 illustrates a methodology 1800 that facilitates leveraging existing synchronization mechanisms within a data storage system to ensure data consistency between data storage systems. At reference numeral 1802, data within data storage system can be identified to be synchronized and/or participate in a secure peer to peer synchronized community. At reference numeral 1804, an existing synchronization technique can be leveraged from the data storage system in order to provide data synchronization to the peer to peer community and/or the synchronization relationship. For instance, the tracking within the data storage system can capture the data change(s) to the entities to facilitate synchronizing data between two disparate systems maintaining sets of data.

At reference numeral 1806, a peer to peer synchronization community can be created with at least one user participating therewith. The synchronized community can include replicas (e.g., synchronized folders belonging to users in the community) and a manager (e.g., a member of the community who is authorized to make changes to the replica membership list). In one example, managers process a request and make changes to the membership metadata and then synchronize the metadata to the others in the community. At reference numeral 1808, each user within the community can participate with a particular level and/or tier of access to the data within such synchronized peer to peer community.

Figure 19:
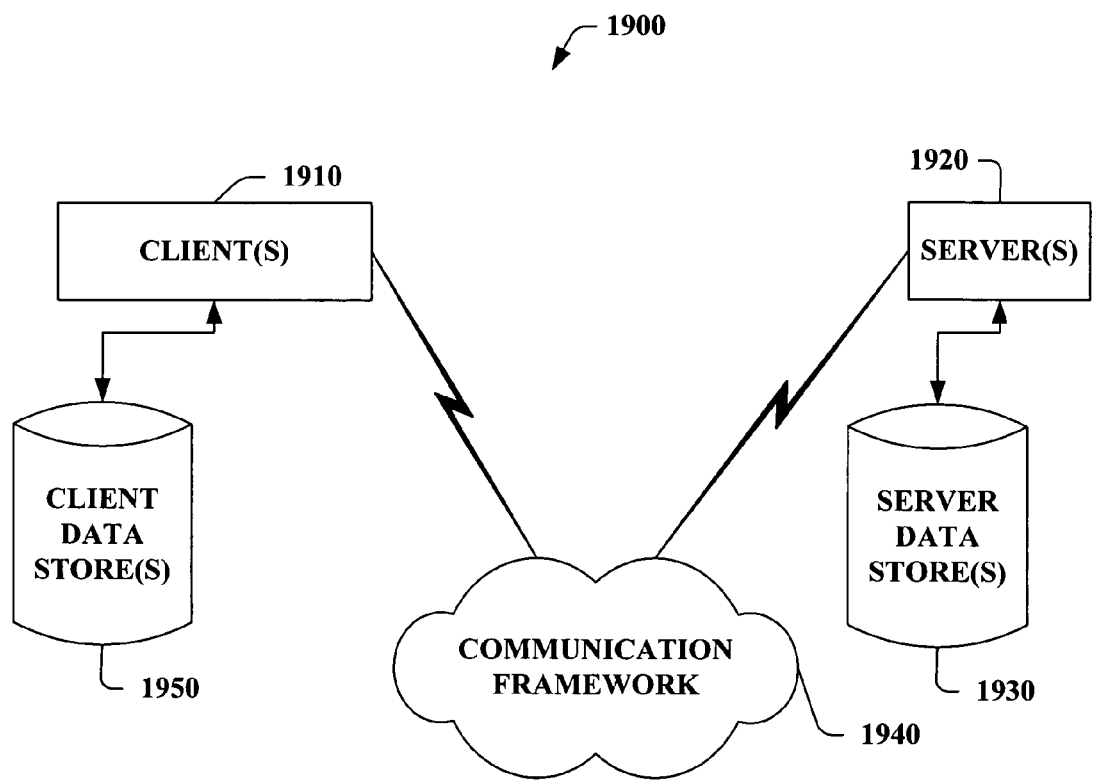
FIG. 19 illustrates an exemplary networking environment, wherein the novel aspects of the claimed subject matter can be employed.
Figure 20:
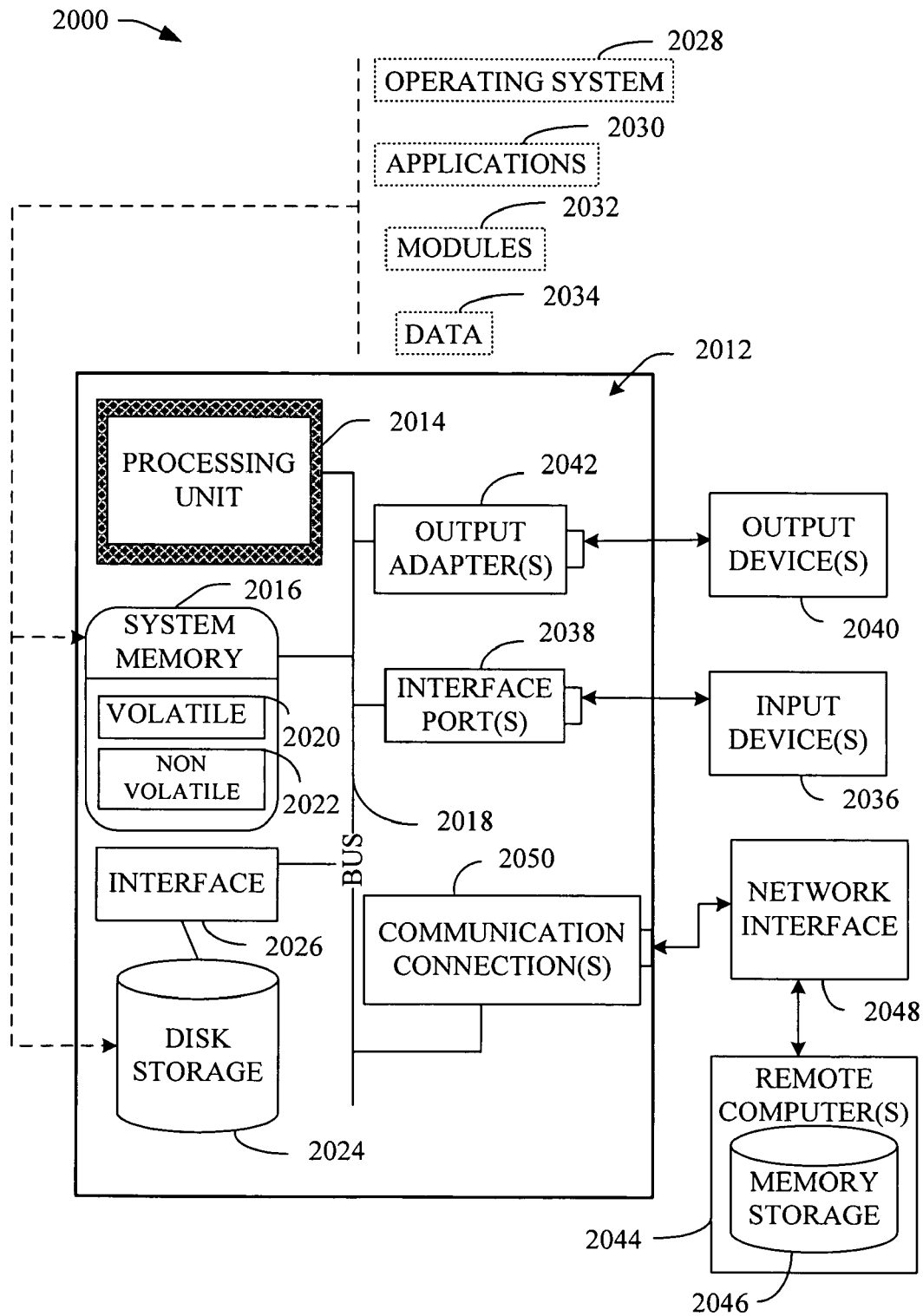
FIG. 20 illustrates an exemplary operating environment that can be employed in accordance with the claimed subject matter.

In order to provide additional context for implementing various aspects of the claimed subject matter, FIGS. 19-20 and the following discussion is intended to provide a brief, general description of a suitable computing environment in which the various aspects of the subject innovation may be implemented. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 19 is a schematic block diagram of a sample-computing environment 1900 with which the claimed subject matter can interact. The system 1900 includes one or more client(s) 1910. The client(s) 1910 can be hardware and/or software (e.g., threads, processes, computing devices). The system 1900 also includes one or more server(s) 1920. The server(s) 1920 can be hardware and/or software (e.g., threads, processes, computing devices). The servers 1920 can house threads to perform transformations by employing the subject innovation, for example.

One possible communication between a client 1910 and a server 1920 can be in the form of a data packet adapted to be transmitted between two or more computer processes. The system 1900 includes a communication framework 1940 that can be employed to facilitate communications between the client(s) 1910 and the server(s) 1920. The client(s) 1910 are operably connected to one or more client data store(s) 1950 that can be employed to store information local to the client(s) 1910. Similarly, the server(s) 1920 are operably connected to one or more server data store(s) 1930 that can be employed to store information local to the servers 1920.

With reference to FIG. 20, an exemplary environment 2000 for implementing various aspects of the claimed subject matter includes a computer 2012. The computer 2012 includes a processing unit 2014, a system memory 2016, and a system bus 2018. The system bus 2018 couples system components including, but not limited to, the system memory 2016 to the processing unit 2014. The processing unit 2014 can be any of various available processors. Dual microprocessors and other multiprocessor architectures also can be employed as the processing unit 2014.

The system bus 2018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 2016 includes volatile memory 2020 and nonvolatile memory 2022. The basic input/output system (BIOS), containing the basic routines to transfer information between elements within the computer 2012, such as during start-up, is stored in nonvolatile memory 2022. By way of illustration, and not limitation, nonvolatile memory 2022 can include read only memory (ROM), programmable ROM (PROM), electrically programmable ROM (EPROM), electrically erasable programmable ROM (EEPROM), or flash memory. Volatile memory 2020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 2012 also includes removable/non-removable, volatile/non-volatile computer storage media. FIG. 20 illustrates, for example a disk storage 2024. Disk storage 2024 includes, but is not limited to, devices like a magnetic disk drive, floppy disk drive, tape drive, Jaz drive, Zip drive, LS-100 drive, flash memory card, or memory stick. In addition, disk storage 2024 can include storage media separately or in combination with other storage media including an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 2024 to the system bus 2018, a removable or non-removable interface is typically used such as interface 2026.

It is to be appreciated that FIG. 20 describes software that acts as an intermediary between users and the basic computer resources described in the suitable operating environment 2000. Such software includes an operating system 2028. Operating system 2028, which can be stored on disk storage 2024, acts to control and allocate resources of the computer system 2012. System applications 2030 take advantage of the management of resources by operating system 2028 through program modules 2032 and program data 2034 stored either in system memory 2016 or on disk storage 2024. It is to be appreciated that the claimed subject matter can be implemented with various operating systems or combinations of operating systems.

A user enters commands or information into the computer 2012 through input device(s) 2036. Input devices 2036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2014 through the system bus 2018 via interface port(s) 2038. Interface port(s) 2038 include, for example, a serial port, a parallel port, a game port, and a universal serial bus (USB). Output device(s) 2040 use some of the same type of ports as input device(s) 2036. Thus, for example, a USB port may be used to provide input to computer 2012, and to output information from computer 2012 to an output device 2040. Output adapter 2042 is provided to illustrate that there are some output devices 2040 like monitors, speakers, and printers, among other output devices 2040, which require special adapters. The output adapters 2042 include, by way of illustration and not limitation, video and sound cards that provide a means of connection between the output device 2040 and the system bus 2018. It should be noted that other devices and/or systems of devices provide both input and output capabilities such as remote computer(s) 2044.

Computer 2012 can operate in a networked environment using logical connections to one or more remote computers, such as remote computer(s) 2044. The remote computer(s) 2044 can be a personal computer, a server, a router, a network PC, a workstation, a microprocessor based appliance, a peer device or other common network node and the like, and typically includes many or all of the elements described relative to computer 2012. For purposes of brevity, only a memory storage device 2046 is illustrated with remote computer(s) 2044. Remote computer(s) 2044 is logically connected to computer 2012 through a network interface 2048 and then physically connected via communication connection 2050. Network interface 2048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2050 refers to the hardware/software employed to connect the network interface 2048 to the bus 2018. While communication connection 2050 is shown for illustrative clarity inside computer 2012, it can also be external to computer 2012. The hardware/software necessary for connection to the network interface 2048 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

APPENDIX A

```
namespace OS.Storage.Synchronization.SelfHost
{
    /// <summary>
    /// This represents the Data storage system fileshare that corresponds
    /// to a SynchronizedFolder.
    /// </summary>
    public class Share
    {
        public string Path{ get; }
        public string Name{ get; }
    }
    /// <summary>
    /// The synchronization mode of a Peer.
    /// </summary>
    enum SynchronizationMode
    {
        Automatic,
        Manual
    }
    /// <summary>
    /// The SyncController is designed as a long running object that
    /// monitors the local default store for synchronized folders. It
    /// responds to changes in the synchronized folders by performing
    /// the appropriate synchronization operations. It also synchronizes
    /// metadata such as membership lists and permissions to all peers
    /// of a community.
    ///
    /// This is a singleton that is initiated by calling the static method Start,
    /// which returns a handle to the created SyncController instance.
    /// To stop, call the method Stop( ) on this instance
    /// Alternatively, the using pattern can be used to automatically stop the
    /// controller:
    ///     using (SyncController.Start( ))
    ///     {
    ///         ...
    ///     }
    /// </summary>
    public class SyncController : DisposableObject
    {
        public static void Start( );
        public void Stop( );
    }
    /// <summary>
    /// This represents a local SynchronizedFolder.
    /// </summary>
    public class SynchronizedFolder
    {
        /// <summary>
        /// The Data storage system fileshare
        /// </summary>
        /// <value></value>
        public Share Share { get; }
        public string Name { get; }
        public string Description { get; }
        public Item Container{ get; }
        /// <summary>
        /// Returns all the Users that sync with this synchronized folder
        /// </summary>
        /// <value></value>
        public Users Users { get; }
        /// <summary>
        /// Creates a new synchronized folder at the specified container
        /// </summary>
        /// <param name="container"></param>
        /// <returns>The created synchronized folder.</returns>
        public static SynchronizedFolder Create(Item container, string
```

APPENDIX A-continued

```
synchronizedFolderName, out string errorMessage);
    /// <summary>
    /// Opens an existing synchronized folder.
    /// </summary>
    /// <param name="container"></param>
    public static SynchronizedFolder Open(Item container);
    /// <summary>
    /// Joins as an existing community.
    /// </summary>
    /// <param name="container">The container to share</param>
    /// <param name="synchronizedFolderName">The name of the community</param>
    /// <param name="peer"></param>
    /// <returns></returns>
    public static SynchronizedFolder Join(Item container, string synchronizedFolderName, Peer peer)
    /// <summary>
    /// This removes all the folders for a user.
    /// If this will remove the last Manager folder and leave only non-
    /// Manager folders, this throws an exception.
    /// </summary>
    /// <param name="user"></param>
    public void Remove(User user);
    /// <summary>
    /// This removes the folder of a peer. If this is not the current peer,
    /// the current user must be the owner or a manager.
    /// If this will remove the last Manager folder and leave only non-
    /// Manager folders, this throws an exception.
    /// </summary>
    /// <param name="peer"></param>
    public void Remove(Peer Peer);
    /// <summary>
    /// Initiates sync with all appropriate peers.
    /// </summary>
    public void Synchronize( );
    /// <summary>
    /// Saves all configuration changes to the folder, its users and
    /// peers, etc., to the store.
    /// </summary>
    public void Save( );
}
/// <summary>
/// The types of users in the system.
/// </summary>
enum UserType
{
    Reader,
    Writer,
    Manager
}
/// <summary>
/// A set of Users. Users can be added and removed
/// from this set.
/// </summary>
public class Users : IEnumerable<User>
{
    IEnumerator GetEnumerator( );
    void Add(User user);
    void Remove(User user);
}
/// <summary>
/// A set of Peers. Peers can be added and removed
/// from this set.
/// </summary>
public class Peers : IEnumerable<Peers>
{
    IEnumerator GetEnumerator( );
    void Add(Peer Peer);
    void Remove(Peer Peer);
}
/// <summary>
/// Represents a single User. Users own Peers.
/// </summary>
public class User
{
    public Guid Sid { get; }
    /// <summary>
    /// The user name, for example levn.
    /// </summary>
    public string UserName { get; }
    /// <summary>
    /// The user's domain, for example redmond.
    /// </summary>
    public string Domain { get; }
    /// <summary>
    /// The user's type, for example Manager. Setting this
    /// requires you to be a manager, otherwise an exception
    /// is thrown.
    /// </summary>
    public UserType UserType { get; set}
    /// <summary>
    /// The set of Peers owned by this User.
    /// This is null if the User has been invited
    /// but has not yet joined (accepted.)
    /// </summary>
    /// <value></value>
    public Peer[ ] Peers { get; }
}
/// <summary>
/// This represents a remote folder that synchronizes with a
/// local SynchronizedFolder.
/// </summary>
public class Peer
{
    /// <summary>
    /// The Data storage system fileshare
    /// </summary>
    /// <value></value>
    public Share Share { get; }
    /// <summary>
    /// The owner of the Peer
    /// </summary>
    /// <value></value>
    public User User { get; }
    /// <summary>
    /// The synchronization mode of the Peer
    /// </summary>
    /// <value></value>
    public SynchronizationMode SynchronizationMode { get; }
}
```

What is claimed is:

1. A method for creating a sync relationship in a secure peer-to-peer data synchronization community comprising:

receiving user input at a first computing device that specifies that a first folder on the first computing device is to be synchronized with a second folder on a second computing device;

in response to the input, the first computing device creating an invitation that includes information for creating a sync relationship between the first and second folders, the information including a membership list that defines access rights to the first folder for each user in the synchronization community, such that the membership list includes at least one other user of another computing device in the synchronization community in addition to a user of the second computing device as well as the access rights for the at least one other user and the user of the second computing device for accessing the first folder; and sending the invitation from the first computing device to the second computing device such that upon the second computing device executing the invitation, the sync relationship is established between the first and second folders such that the second folder stores the membership list including the access rights for the user of the second computing device as well as the access rights of the at least one other user for accessing the first folder.

2. The method of claim 1, wherein the access rights specify whether a user of the second computing device is a manager such that the user may modify the access rights of any user in the synchronization community.

3. The method of claim 1, wherein the first folder includes a requests folder for storing requests sent to and from the first computing device for establishing sync relationships in the synchronization community.

4. The method of claim 3, wherein the requests folder includes only a single subfolder which contains requests sent to and from a manager of the synchronization community.

5. The method of claim 3, wherein the user of the first computing device is a manager of the synchronization community, and wherein the requests folder includes a subfolder for each peer in the synchronization community, each subfolder including the requests sent by the peer to the manager and requests sent by the manager to the peer.

6. The method of claim 1, further comprising:
receiving a request, from the second computing device, to remove the second folder from the synchronization community;
in response, deleting the sync relationship between the first and second folders, including updating the membership list to indicate the removal of the second folder from the synchronization community; and
synchronizing the membership list with a replica of the membership list stored on other computing devices that make up the synchronization community.

7. The method of claim 1, further comprising:
receiving an indication from a component of the first computing device that the contents of the first folder have been changed; and
in response, synchronizing the first folder with the second folder.

8. The method of claim 7, wherein the component of the first computing device is a component of an underlying data storage system that maintains the first folder such that no new mechanisms are required within the components of the synchronization community for tracking changes to the first folder.

9. The method of claim 1, wherein the invitation also includes the data of the first folder that is to be replicated to the second folder.

10. One or more computer storage media storing computer executable instructions which when executed by a processor perform steps for creating a sync relationship in a secure peer-to-peer data synchronization community comprising:
receiving user input at a first computing device that specifies that a first folder on the first computing device is to be synchronized with a second folder on a second computing device;
in response to the input, the first computing device creating an invitation that includes information for creating a sync relationship between the first and second folders, the information including a membership list that defines access rights to the first folder for each user in the synchronization community, such that the membership list includes at least one other user of another computing device in the synchronization community in addition to a user of the second computing device as well as the access rights for the at least one other user and the user of the second computing device for accessing the first folder; and
sending the invitation from the first computing device to the second computing device such that upon the second computing device executing the invitation, the sync relationship is established between the first and second folders such that the second folder stores the membership list including the access rights for the user of the second computing device as well as the access rights of the at least one other user for accessing the first folder.

11. The one or more computer storage media of claim 10, wherein the access rights specify whether a user of the second computing device is a manager such that the user may modify the access rights of any user in the synchronization community.

12. The one or more computer storage media of claim 10, wherein the first folder includes a requests folder for storing requests sent to and from the first computing device for establishing sync relationships in the synchronization community.

13. The one or more computer storage media of claim 12, wherein the requests folder includes only a single subfolder which contains requests sent to and from a manager of the synchronization community.

14. The one or more computer storage media of claim 12, wherein the user of the first computing device is a manager of the synchronization community, and wherein the requests folder includes a subfolder for each peer in the synchronization community, each subfolder including the requests sent by the peer to the manager and requests sent by the manager to the peer.

15. The one or more computer storage media of claim 10, further comprising:
receiving a request, from the second computing device, to remove the second folder from the synchronization community;
in response, deleting the sync relationship between the first and second folders, including updating the membership list to indicate the removal of the second folder from the synchronization community; and
synchronizing the membership list with a replica of the membership list stored on other computing devices that make up the synchronization community.

16. The one or more computer storage media of claim 10, further comprising:
receiving an indication from a component of the first computing device that the contents of the first folder have been changed; and
in response, synchronizing the first folder with the second folder.

17. The one or more computer storage media of claim 16, wherein the component of the first computing device is a component of an underlying data storage system that maintains the first folder such that no new mechanisms are required within the components of the synchronization community for tracking changes to the first folder.

18. A computing system configured as a manager in a secure peer-to-peer data synchronization community, the system comprising:
a processor; and
memory storing the following components:
a tracking component of a data storage system, the tracking component tracking changes that occur to the data storage system;
a sync component for creating sync relationships between folders on the computing system and folders stored on other computing systems in the synchronization community, the sync component including a user sync manager component for creating the sync relationships, creating synchronized folders, inviting users to join the synchronization community, accepting invitations to join the synchronization community, removing users from the synchronization community, and maintaining a membership list of each user's access rights to synchronized folders in the synchronization community; and a sync application that receives user input to the computing system for communicating with the sync component;

wherein upon receiving user input specifying that a first folder of the computing system is to be synchronized within the synchronization community, the sync application communicates the user input to the user sync manager of the sync component, such that the user sync manager creates an invitation which includes an indication that the first folder is to be synchronized with another folder on a second computing system in the synchronization community and also includes the membership list that specifies the access rights the user of the second computing system as well as at least one other user of another computing system in the synchronization community will have to the first folder, the user sync manager further sending the invitation to the second computing system such that in response to the user of the second computing system selecting a second folder with which to synchronize the first folder, a sync relationship is created between the first and second folders such that the second folder stores the membership list including the access rights for the user of the second computing system as well as the access rights of the at least one other user for accessing the first folder.

19. The computing system of claim 18, wherein upon receiving a remove request from the second computing system, the user sync manager updates the membership list by removing the sync relationship between the first and second folders from the synchronization community, and then synchronizes the updated membership list with a replica of the membership list that is stored on other computing systems that are part of the synchronization community.

20. The computing system of claim 18, wherein the sync application further provides a user interface in response to user input that selects a user from the membership list, the user interface providing an option to specify the selected user as a manager, reader, or writer in the synchronization community and an option to remove the user from the synchronization community.

* * * * *